US012473715B2

(12) United States Patent
Saegusa et al.

(10) Patent No.: US 12,473,715 B2
(45) Date of Patent: Nov. 18, 2025

(54) WORK MACHINE

(71) Applicant: HITACHI CONSTRUCTION MACHINERY CO., LTD., Tokyo (JP)

(72) Inventors: Takashi Saegusa, Tokyo (JP); Yuuki Nagaoka, Tsuchiura (JP); Makoto Saen, Tsuchiura (JP); Kazuhiro Shibamori, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 298 days.

(21) Appl. No.: 18/025,440

(22) PCT Filed: Mar. 16, 2022

(86) PCT No.: PCT/JP2022/012052
§ 371 (c)(1),
(2) Date: Mar. 9, 2023

(87) PCT Pub. No.: WO2022/202568
PCT Pub. Date: Sep. 29, 2022

(65) Prior Publication Data
US 2023/0323632 A1 Oct. 12, 2023

(30) Foreign Application Priority Data
Mar. 24, 2021 (JP) .................................. 2021-050792

(51) Int. Cl.
*E02F 9/20* (2006.01)
*H04W 24/08* (2009.01)
(52) U.S. Cl.
CPC ............. *E02F 9/205* (2013.01); *H04W 24/08* (2013.01)

(58) Field of Classification Search
CPC ......... E02F 9/205; E02F 9/2054; E02F 9/264; E02F 9/267; E02F 9/20; H04W 24/08; H04L 13/00; H04L 69/00
See application file for complete search history.

(56) References Cited

U.S. PATENT DOCUMENTS

2003/0036824 A1\* 2/2003 Kuroda .................. G01C 21/26
701/1
2003/0193406 A1\* 10/2003 Kinugawa ............... B60R 25/33
340/870.16

(Continued)

FOREIGN PATENT DOCUMENTS

JP  2003-189376 A  7/2003
JP  2009-33642 A   2/2009

(Continued)

OTHER PUBLICATIONS

International Search Report of PCT/JP2022/012052 dated Jun. 7, 2022.

(Continued)

*Primary Examiner* — Jelani A Smith
*Assistant Examiner* — Alyssa Rorie
(74) *Attorney, Agent, or Firm* — MATTINGLY & MALUR, PC

(57) ABSTRACT

A work machine includes a body, a work implement attached to the body, and a controller that executes a transmission process of transmitting data to an external apparatus installed outside the body. The controller measures a speed of communication with the external apparatus, places a functional restriction on the transmission process when the speed of communication is lower than a predetermined required speed, reinforces the functional restriction on the transmission process as the speed of communication lowers, and reinforces the functional restriction on the transmission process when a state of the work machine is an operation (Continued)

state, as compared to a case where the state of the work machine is not the operation state.

8 Claims, 11 Drawing Sheets

(56) References Cited

U.S. PATENT DOCUMENTS

| | | | |
|---|---|---|---|
| 2004/0267983 A1* | 12/2004 | Oda | H04L 49/90 |
| | | | 710/56 |
| 2005/0286422 A1* | 12/2005 | Funato | H04L 47/2416 |
| | | | 370/235 |
| 2013/0262611 A1 | 10/2013 | Lim | |
| 2015/0279123 A1 | 10/2015 | Yamanobe et al. | |
| 2015/0293702 A1* | 10/2015 | Fujimori | G07C 5/085 |
| | | | 711/154 |
| 2017/0293295 A1* | 10/2017 | Tani | A01B 69/00 |
| 2020/0174465 A1* | 6/2020 | Minagawa | E02F 9/267 |
| 2021/0014643 A1* | 1/2021 | Kuroda | H04W 4/026 |

FOREIGN PATENT DOCUMENTS

| | | |
|---|---|---|
| JP | 2017-92908 A | 5/2017 |
| JP | 2018-107568 A | 7/2018 |
| WO | 2015/029268 A1 | 3/2015 |

OTHER PUBLICATIONS

International Preliminary Report on Patentability received in corresponding International Application No. PCT/JP2022/012052 dated Oct. 5, 2023.

\* cited by examiner

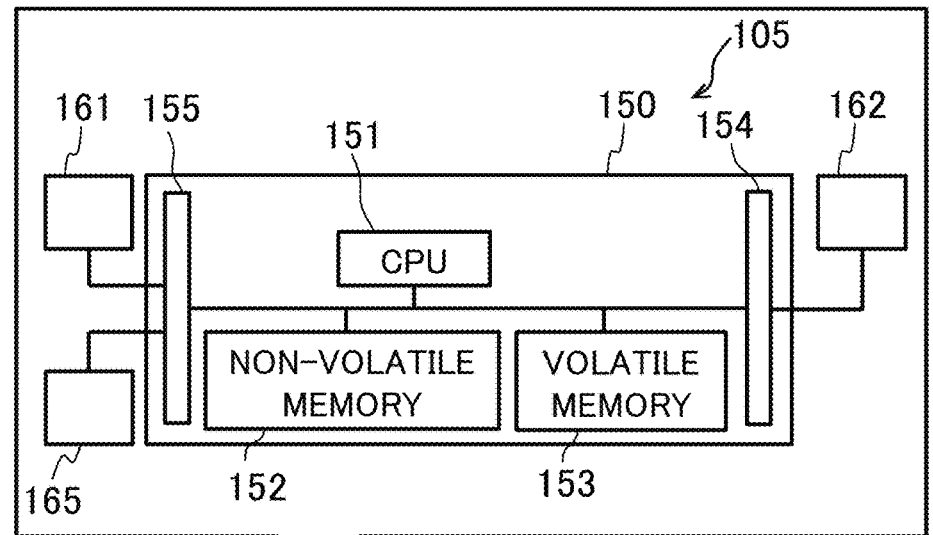
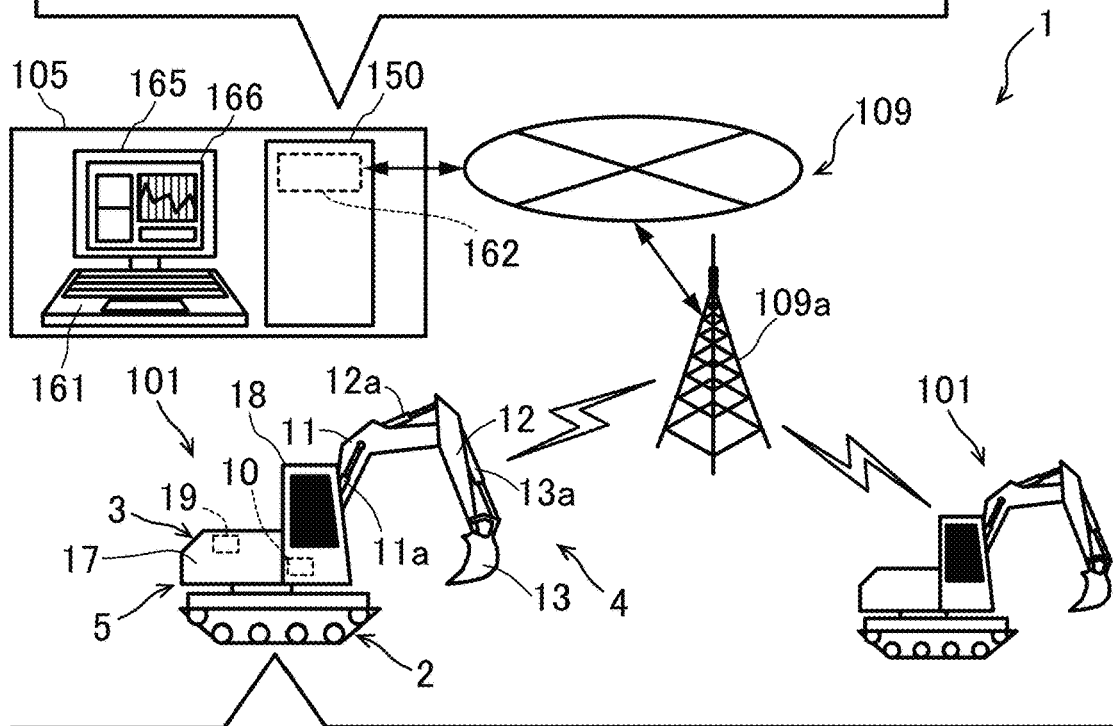
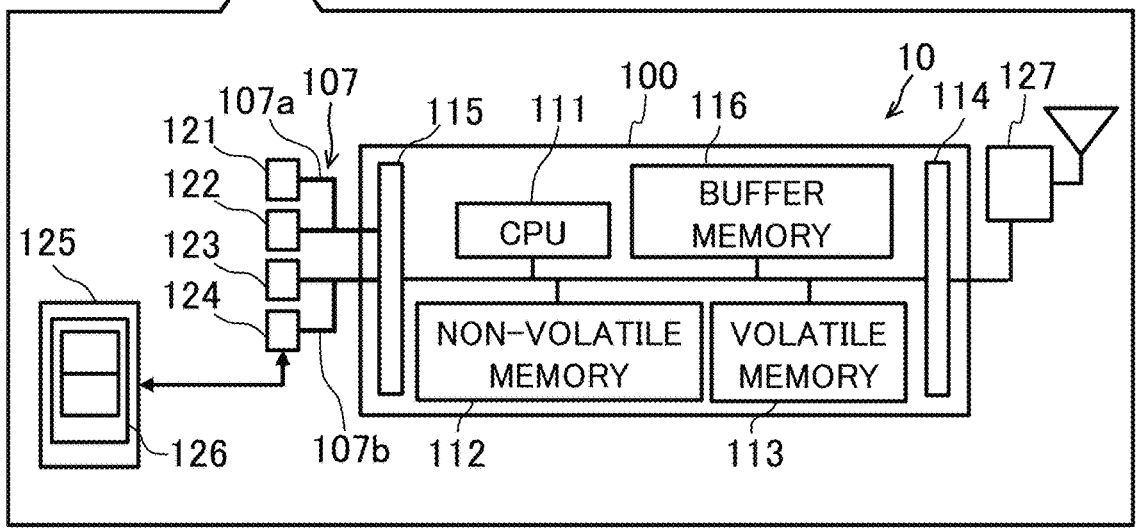
FIG. 1

FIG. 4

| REQUIRED SPEED Tsr | 5Mbps |
|---|---|

300 — Table

| | | CHOICE CONDITION | | |
|---|---|---|---|---|
| No. | ENABLE/DISABLE CONDITION | DATA TRANSMISSION ALLOWABLE AMOUNT CONDITION | DATA STORAGE ALLOWABLE TIME CONDITION | |
| 1 | ENABLED | 1M~5Mbps | EQUAL TO OR LONGER THAN 1 min | |
| 2 | ENABLED | 1M~5Mbps | SHORTER THAN 1 min | |
| 3 | ENABLED | 500k~1Mbps | EQUAL TO OR LONGER THAN 1 min | |
| 4 | ENABLED | 500k~1Mbps | SHORTER THAN 1 min | |
| 5 | ENABLED | LOWER THAN 500 kbps | — | |

301 / 302 — PROCESSING PROFILE

| No. | TRANSMISSION SUSPENSION | RETRY REQUEST | BUFFER | DATA-REDUCED TRANSMISSION |
|---|---|---|---|---|
| 1 | | | ○ | ○ |
| 2 | | | | ○ |
| 3 | ○ | | ○ | |
| 4 | ○ | ○ | | |

304 — PROCESSING CONTENT DETAIL INFORMATION

| No. | BUFFER SUBJECT | BUFFER AMOUNT | DATA-REDUCTION SUBJECT | DATA REDUCTION AMOUNT |
|---|---|---|---|---|
| 1 | Data No.xx | 300kbps | Data No.yy | 200kbps |
| 2 | — | — | Data No.yy | 500kbps |
| 3 | Data No.xx | 500kbps | — | — |
| 4 | — | — | — | — |

FIG. 5

| | STATE OF WORK MACHINE | DATA STORAGE AMOUNT Da |
|---|---|---|
| S401 | WAITING STATE | 500MByte |
| S402 | STOPPED STATE | 500MByte |
| S403 | TRAVELLING STATE | 100MByte |
| S404 | WORKING STATE | 10MByte |

500

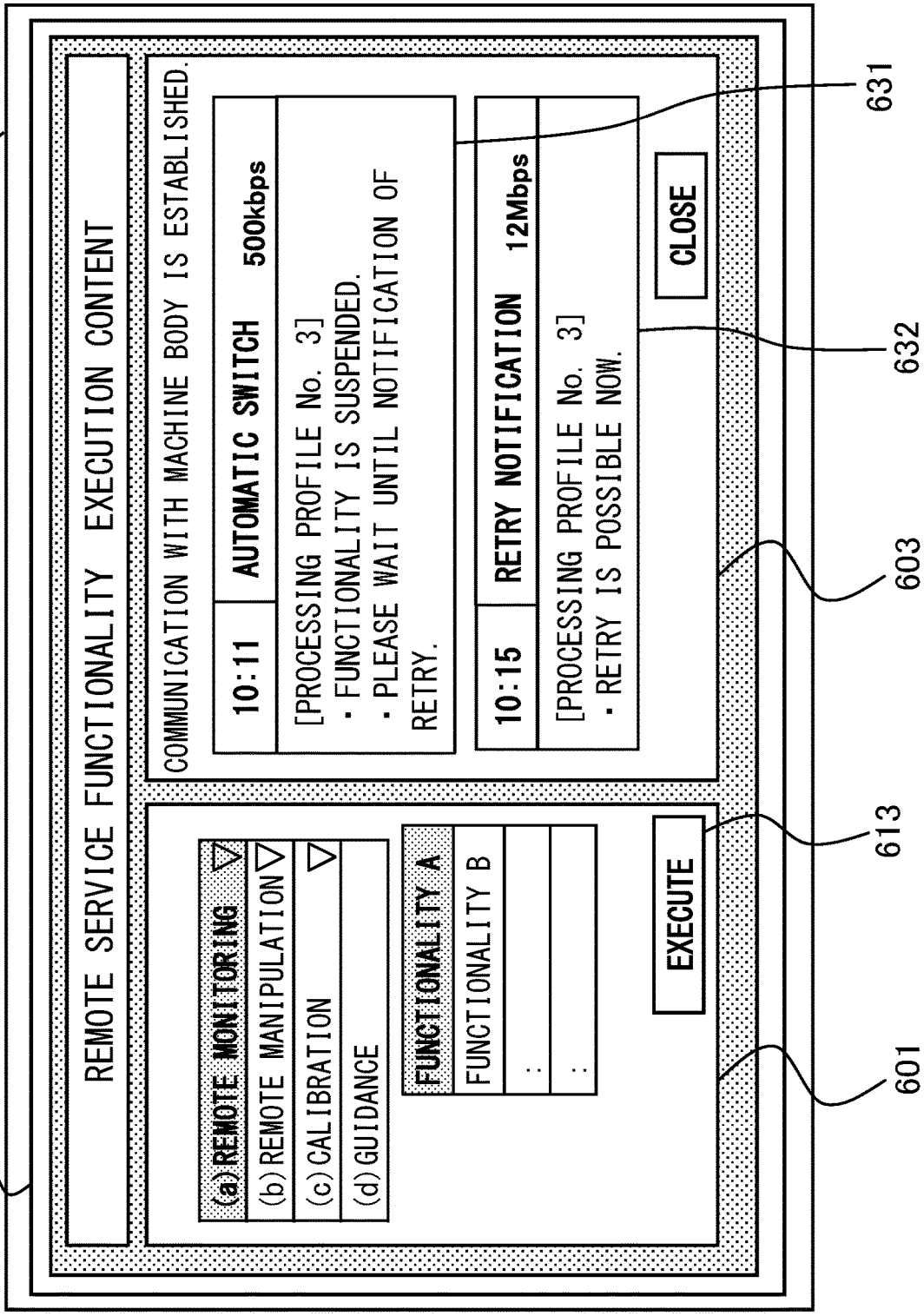

FIG. 9

302 PROCESSING PROFILE

| No. | TRANSMISSION SUSPENSION | RETRY REQUEST | BUFFER | DATA-REDUCED TRANSMISSION |
|---|---|---|---|---|
| 1 |  |  | O | O |
| 2 |  |  | O | O |
| 3 | O | O |  |  |
| 4 | O | O |  |  |

303B CHOICE CONDITION

| No. | ENABLE/DISABLE CONDITION | DATA TRANSMISSION ALLOWABLE AMOUNT CONDITION | WORK MACHINE STATE CONDITION |
|---|---|---|---|
| 1 | ENABLED | 1M~5Mbps | INOPERATIVE STATE |
| 2 | ENABLED | 1M~5Mbps | OPERATION STATE |
| 3 | ENABLED | 500k~1Mbps | INOPERATIVE STATE |
| 4 | ENABLED | 500k~1Mbps | OPERATION STATE |
| 5 | ENABLED | LOWER THAN 500 kbps | — |

WORK MACHINE

TECHNICAL FIELD

The present invention relates to a work machine.

BACKGROUND ART

There is known a managing system including a managing apparatus that acquires information regarding a work machine via a wireless communication system applied to communication of a mobile body such as a mobile phone and that manages the work machine (see Patent Document 1).

The work machine described in Patent Document 1 includes an information generating section that generates work machine information as information regarding the work machine, a dividing section that divides the work machine information into pieces each having a predetermined amount of data and that generates divided work machine information, an information appending section that appends attribute information representing an attribute of the divided work machine information to the divided work machine information, and a communication section that transmits, to the outside of the work machine, the work machine information or the divided work machine information to which the attribute information has been appended. Even when it is not necessary to divide the work machine information, the dividing section performs the process of dividing the work machine information into the divided work machine information, and the information appending section appends the attribute information to the divided work machine information.

PRIOR ART DOCUMENT

Patent Document

Patent Document 1: PCT Patent Publication No. WO2015/029268

SUMMARY OF THE INVENTION

Problem to be Solved by the Invention

However, the technology described in Patent Document 1 does not take into consideration changes in the speed of communication caused by weather-related situational changes that occur when the air above the work machine is covered with thick clouds, for example. In addition, the technology described in Patent Document 1 does not take into consideration changes in the speed of communication caused by changes in the state of the work machine either. Because of this, in the technology described in Patent Document 1, even when the speed of communication has lowered, the process of transmitting the divided work machine information to a managing apparatus is continued as in a case where the speed of communication is sufficient. Hence, there is a fear that the work machine information cannot be transmitted to the managing apparatus appropriately.

An object of the present invention is to appropriately transmit information regarding a work machine to an external apparatus.

Means for Solving the Problem

A work machine according to an aspect of the present invention includes a body, a work implement attached to the body, and a controller that executes a transmission process of transmitting data to an external apparatus installed outside the body. The controller is configured to measure a speed of communication with the external apparatus, place a functional restriction on the transmission process when the speed of communication is lower than a predetermined required speed, reinforce the functional restriction on the transmission process as the speed of communication lowers, and reinforce the functional restriction on the transmission process when a state of the work machine is an operation state, as compared to a case where the state of the work machine is not the operation state.

Advantages of the Invention

According to the present invention, information regarding a work machine can be transmitted to an external apparatus appropriately.

BRIEF DESCRIPTION OF THE DRAWINGS

FIG. 1 is a figure depicting a managing system according to an embodiment of the present invention.

FIG. 4 is a figure depicting remote service request information.

FIG. 5 is a figure depicting a data storage amount table stored on a non-volatile memory.

FIG. 7B is a figure depicting an example of a screen displayed on the display screen of the display device, and depicts an example in which a communication log is displayed.

FIG. 9 is a figure depicting a choice condition table used at a work machine according to a second modification example.

MODE FOR CARRYING OUT THE INVENTION

Figure 2:
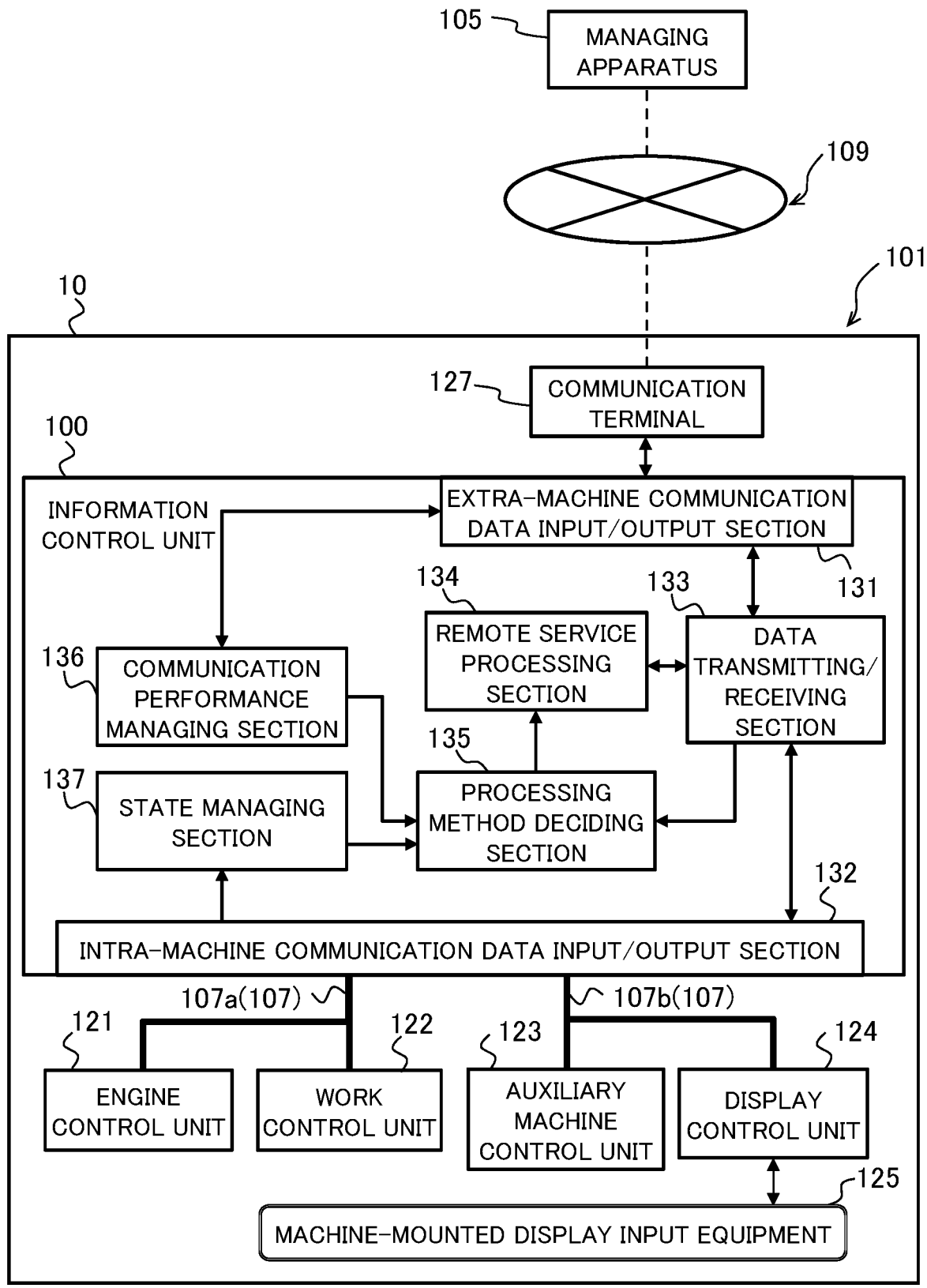
FIG. 2 is a functional block diagram of an information control unit.

A work machine according to an embodiment of the present invention is explained by referring to the figures.

FIG. 1 is a figure depicting a managing system 1 according to the embodiment of the present invention. As depicted in FIG. 1, the managing system 1 includes work machines 101 that perform work at a work site, and a managing apparatus 105 provided in a management center at a location apart from the work site. The work machines 101 are crawler-type hydraulic excavators in an example explained in the present embodiment. The work machines 101 perform work such as engineering work, construction work, demolition work, or dredging work at the work site.

Each of the work machines 101 includes a body 5, a work implement 4 attached to the body 5, and a controller 10 that executes a transmission process of transmitting data to the managing apparatus 105 installed outside the body 5 and a reception process of receiving data from the managing apparatus 105. The body 5 has a crawler-type travel structure 2 and a swing structure 3 provided on the travel structure 2 swingably. The controller 10 is mounted on the swing structure 3. The work implement 4 is an articulated-type work implement attached to the swing structure 3, and has a boom 11, an arm 12, and a bucket 13 as well as hydraulic cylinders (boom cylinder 11a, arm cylinder 12a, and bucket cylinder 13a) that drive the boom 11, the arm 12, and the bucket 13.

The swing structure 3 has an operation room 18 provided on a swing frame and an engine compartment 17 provided behind the operation room 18. An engine 19 and hydraulic equipment such as a hydraulic pump driven by the engine 19 are contained in the engine compartment 17. The engine 19 is a power source of the work machine 101, and includes an internal combustion engine such as a diesel engine, for example.

The managing apparatus 105 is an external apparatus that manages (recognizes and monitors) the states of the work machines 101 remotely. For example, the managing apparatus 105 is installed in a facility such as the head office, a branch, or a factory of a manufacturer (manufacturing company) of the work machines 101, a rental company of the work machines 101, a data center that specializes in running servers, or a facility of the owner who owns the work machines 101 or the like.

The managing system 1 is configured such that bidirectional communication between the work machines 101 that perform work at the work site and the managing apparatus 105 installed at the location apart from the work site can be performed via a first communication network 109 which is a wide area network. That is, the work machines 101 and the managing apparatus 105 can transmit and receive data therebetween via the first communication network 109.

The first communication network 109 is, for example, a mobile phone communication network (mobile communication network) provided by a mobile phone operator or the like, or the Internet. For example, when the work machines 101 and a wireless base station 109a are connected to each other by the mobile phone communication network (mobile communication network), the wireless base station 109a that has received data from one work machine 101 transmits the received data to the managing apparatus 105 via the Internet. The managing apparatus 105 causes a display screen 166 of a display device 165 to display machine-body data acquired from the work machine 101.

The managing apparatus 105 includes a management server 150, an input device 161 for inputting predetermined information to the management server 150, a communication device 162 that receives information transmitted from the work machines 101 (machine-body data regarding the work machines 101 that changes time-sequentially, etc.), and the display device 165 which is an output device that outputs predetermined information on the basis of control signals from the management server 150. For example, the input device 161 is a keyboard, a mouse, and the like. For example, the display device 165 is a liquid crystal display device and displays, on the display screen 166, a display image such as machine-body data regarding the work machine 101 on the basis of display control signals from the management server 150.

The management server 150 is configured with a computer including a CPU (Central Processing Unit) 151 as an operation circuit, a volatile memory 153 which is what is called a RAM (Random Access Memory) as a storage device, a non-volatile memory 152 such as an EEPROM (Electrically Erasable Programmable Read Only Memory) or a flash memory as a storage device, a first communication interface 154, a second communication interface 155, and other peripheral circuits. Note that the management server 150 may be configured with one computer or may be configured with a plurality of computers. The first communication interface 154 is connected to the communication device 162, and performs data exchange with the controllers 10 of the work machines 101 via the first communication network 109. The second communication interface 155 is connected to the input device 161 and the display device 165 through cables. Note that the management server 150 may be connected to the input device 161 and the display device 165 via the first communication network 109. In this case, the input device 161 and the display device 165 can be installed as a remote terminal at a location apart from both the management center and the work site. Note that the input device 161 and the display device 165 may be a note PC (Personal Computer), a tablet PC, or a smartphone that can be carried by a service staff.

Each of the work machines 101 includes the controller 10 that controls each section of the work machine 101. The controller 10 has a communication terminal 127 that communicates with the managing apparatus 105 via the first communication network 109, a plurality of control units (information control unit 100, engine control unit 121, work control unit 122, auxiliary machine control unit 123, and display control unit 124) that are mutually connected via a second communication network 107 communicatively and that control equipment included in the work machine 101, and machine-mounted display input equipment 125. For example, the second communication network 107 is a machine-mounted network called a CAN (Controller Area Network). Note that, in the example depicted in the figure, the second communication network 107 has a first machine-mounted network 107a that connects the information control unit 100 to the engine control unit 121 and the work control unit 122, and a second machine-mounted network 107b that connects the information control unit 100 to the auxiliary machine control unit 123 and the display control unit 124.

The communication terminal 127 is a wireless communication device that can wirelessly communicate with the wireless base station 109a connected to the first communication network 109, and has a communication interface including a communication antenna whose reception band is 2.1 GHz, for example. The communication terminal 127 exchanges information (data) with the managing apparatus 105 and the like via the wireless base station 109a and the first communication network 109.

The information control unit 100 collects (acquires) machine-body data regarding the work machine 101. The machine-body data includes sensor information sensed by various types of sensors included in the work machine 101, and control information regarding the plurality of control units (121 to 124). The information control unit 100 executes a reception process of receiving a remote service execution command, which will be mentioned later, from the managing apparatus 105 via the first communication network 109. In addition, the information control unit 100 executes a transmission process of transmitting collected machine-body data to the managing apparatus 105 via the first communication network 109 on the basis of the received execution command.

The engine control unit 121 controls the engine rotation speed by adjusting the injection amount of a fuel to be injected into cylinders of the engine 19 by a fuel injection device (not depicted). The work control unit 122 controls, on the basis of operation commands or the like from operation devices in the operation room 18, operations of pieces of hydraulic equipment (e.g., a hydraulic pump, a solenoid proportional valve, a solenoid selector valve, etc.) mounted on the work machine 101, to thereby control operations of the work implement 4, the swing structure 3, and the travel structure 2. For example, the work control unit 122 controls a boom-raising solenoid proportional valve upon reception of input of a boom-raising operation command, and generates a pilot pressure by a solenoid proportional valve. The generated pilot pressure moves a boom directional control valve to the boom-raising side. Accordingly, a working fluid (hydraulic working fluid) delivered from the hydraulic pump is supplied to a bottom-side oil chamber of the boom cylinder 11a through the boom directional control valve, and is also discharged from a rod-side oil chamber of the boom cylinder 11a to a tank. As a result, the boom 11 operates to the raising side.

The auxiliary machine control unit 123 controls auxiliary machines such as a wiper or a room light. The display control unit 124 is connected to the machine-mounted display input equipment 125 provided in the operation room 18 of the work machine 101. The machine-mounted display input equipment 125 is, for example, a touch panel monitor that functions as both a display section and an input section. For example, when operation input is made on the machine-mounted display input equipment 125 to display predetermined information, the display control unit 124 causes a display screen 126 of the machine-mounted display input equipment 125 to display the predetermined information.

The information control unit 100 is configured with a computer including a CPU (Central Processing Unit) 111 as an operation circuit, a volatile memory 113 which is what is called a RAM (Random Access Memory) as a storage device, a non-volatile memory 112 such as an EEPROM (Electrically Erasable Programmable Read Only Memory) or a flash memory as a storage device, a buffer memory 116 such as a DRAM (Dynamic RAM), an extra-machine communication interface (first communication interface) 114, an intra-machine communication interface (second communication interface) 115, and other peripheral circuits. Note that the information control unit 100 may be configured with one computer or may be configured with a plurality of computers. The extra-machine communication interface 114 is connected to the communication terminal 127 and performs data exchange with the managing apparatus 105 via the first communication network 109. The intra-machine communication interface 115 performs data exchange with a plurality of control units (121 to 124) connected to the information control unit 100 via the second communication network 107.

The non-volatile memory 112 of the information control unit 100 has stored thereon programs that can execute various types of computation. That is, the non-volatile memory 112 is a storage medium from which programs for implementing functionalities of the present embodiment can be read out. The CPU 111 is a processing device that loads a program stored on the non-volatile memory 112 to the volatile memory 113 and that executes computation. According to the program, the CPU 111 performs a predetermined computation process on signals taken in from the extra-machine communication interface 114, the intra-machine communication interface 115, the non-volatile memory 112, and the volatile memory 113.

Note that, although not depicted in the figure, similarly to the information control unit 100, the engine control unit 121, the work control unit 122, the auxiliary machine control unit 123, and the display control unit 124 are configured with a computer including a CPU, a volatile memory, a non-volatile memory, an intra-machine communication interface, and other peripheral circuits.

The information control unit 100 acquires machine-body data from the engine control unit 121, the work control unit 122, the auxiliary machine control unit 123, and the display control unit 124. For example, from the engine control unit 121, the information control unit 100 acquires, as machine-body data, state information representing the rotation speed (engine rotation speed) of the engine 19, the temperature of an engine coolant, and the state of the engine 19. Note that the engine rotation speed is sensed by a rotation speed sensor connected to the engine control unit 121, and the temperature of the engine coolant is sensed by a temperature sensor connected to the engine control unit 121.

The information control unit 100 acquires, as machine-body data, state information representing the pressure of a hydraulic cylinder (e.g., the boom cylinder 11a, the arm cylinder 12a, or the bucket cylinder 13a), the delivery pressure of a main pump, the boom angle, the arm angle, the bucket angle, the temperature of the working fluid (hydraulic working fluid), and the state of the work machine 101, from the work control unit 122. Note that these pressure information, angle information and temperature information are sensed by pressure sensors, angle sensors and temperature sensors connected to the work control unit 122.

The information control unit 100 acquires, as machine-body data, state information representing the states of auxiliary machines such as a room light or a wiper, from the auxiliary machine control unit 123. The information control unit 100 acquires information regarding an operation performed on the machine-mounted display input equipment 125 from the display control unit 124.

FIG. 2 is a functional block diagram of the information control unit 100. As depicted in FIG. 2, the information control unit 100 functions as an extra-machine communication data input/output section 131, an intra-machine communication data input/output section 132, a data transmitting/receiving section 133, a remote service processing section 134, a processing method deciding section 135, a communication performance managing section 136, and a state managing section 137. Note that functionalities of the extra-machine communication data input/output section 131 are implemented by the extra-machine communication interface 114, and functionalities of the intra-machine communication data input/output section 132 are implemented by the intra-machine communication interface 115.

The data transmitting/receiving section 133 executes a reception process of receiving data from the managing apparatus 105 via the first communication network 109, and executes a transmission process of transmitting data to the managing apparatus 105 via the first communication network 109. In addition, the data transmitting/receiving section 133 executes a reception process of receiving data from the control units (121 to 124) via the second communication network 107, and executes a transmission process of transmitting data to the control units (121 to 124) via the second communication network 107.

The remote service processing section 134 determines whether or not a remote service execution command transmitted from the managing apparatus 105 has been received by the data transmitting/receiving section 133. The remote service processing section 134 starts the remote service when the remote service processing section 134 determines that the remote service execution command has been received. In the present embodiment, the remote service is remote monitoring that enables monitoring of the state of the work machine 101 from a location (remote location) far apart from the work machine 101, by transmission of machine-body data regarding the work machine 101 to the managing apparatus 105.

When the remote service is started, the remote service processing section 134 selects machine-body data to be transmitted to the managing apparatus 105 from among pieces of machine-body data acquired by the data transmitting/receiving section 133. The remote service processing section 134 controls the data transmitting/receiving section 133 and executes a transmission process of transmitting the selected machine-body data to the managing apparatus 105 via the first communication network 109. The managing apparatus 105 acquires the machine-body data regarding the work machine 101 and causes the display screen 166 of the display device 165 to display the acquired machine-body data.

Accordingly, the machine-body data regarding the work machine 101 performing work at the work site is presented to a manager. Therefore, the manager who manages the work machines 101 by the managing apparatus 105 can monitor the states of the work machines 101 that perform work at the work site which is far apart from her/himself.

The communication performance managing section 136 measures a speed of communication (reception speed and transmission speed) with the managing apparatus 105 via the first communication network 109. The speed of communication is an amount of data communication per unit time and is also called communication performance.

The state managing section 137 manages the state of the work machine 101 on the basis of state information acquired from the control units (121 to 124) via the second communication network 107.

The state managing section 137 acquires state information representing the state of the engine 19 from the engine control unit 121. When the state managing section 137 acquires, from the engine control unit 121, state information indicating that the engine 19 has been stopped, the state managing section 137 determines that the engine (power source) 19 of the work machine 101 has been stopped and that the work machine 101 is not in an operation state, and sets the state of the work machine 101 as a "waiting state."

The state managing section 137 acquires, from the work control unit 122, state information representing the state of the work implement 4, state information representing the state of the swing structure 3, and state information representing the state of the travel structure 2. When the acquired state information regarding the engine 19 indicates that the engine 19 is in operation and when the acquired state information regarding all the work implement 4, the swing structure 3, and the travel structure 2 indicates that they have been stopped, the state managing section 137 determines that the engine (power source) 19 of the work machine 101 is in operation but that the work machine 101 is not in an operation state. In this case, the state managing section 137 sets the state of the work machine 101 as a "stopped state."

The state managing section 137 determines that the work machine 101 is in an operation state, when the acquired state information regarding the travel structure 2 indicates that the travel structure 2 is in operation, and sets the state of the work machine 101 as a "travelling state." When the acquired state information regarding the work implement 4 indicates that the work implement 4 is in operation, the state managing section 137 determines that the work machine 101 is in an operation state, and sets the state of the work machine 101 as a "working state." In addition, when the acquired state information regarding the swing structure 3 indicates the swing structure 3 is in operation, the state managing section 137 determines that the work machine 101 is in an operation state, and sets the state of the work machine 101 as a "working state."

Figure 3:
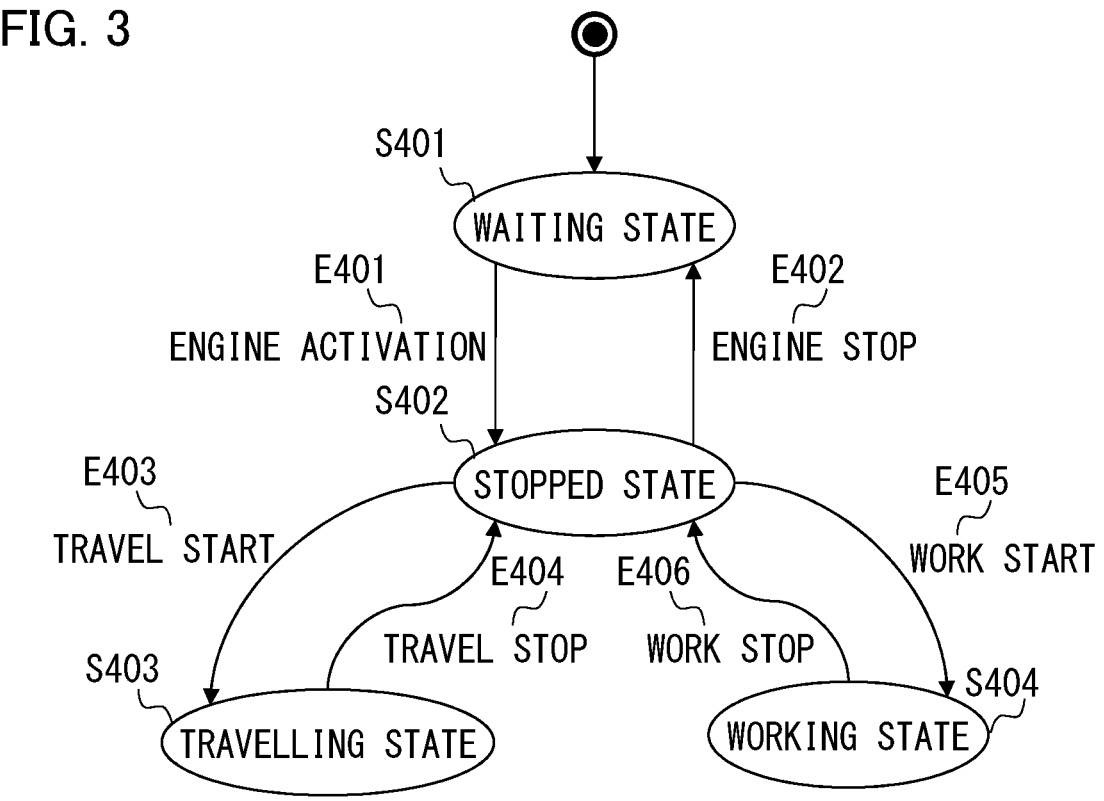
FIG. 3 is a state transition diagram of a work machine.

FIG. 3 is a state transition diagram of the work machine 101. As depicted in FIG. 3, when the work machine 101 is in a waiting state S401 and the engine 19 of the work machine 101 is activated (E401), the state of the work machine 101 transitions from the waiting state S401 to a stopped state S402. When the work machine 101 is in the stopped state S402 and the engine 19 of the work machine 101 is stopped (E402), the state of the work machine 101 transitions from the stopped state S402 to the waiting state S401. When the work machine 101 is in the stopped state S402 and starts travelling (E403), the state of the work machine 101 transitions from the stopped state S402 to a travelling state S403. When the work machine 101 in the travelling state S403 and stops travelling (E404), the state of the work machine 101 transitions from the travelling state S403 to the stopped state S402. When the work machine 101 is in the stopped state S402 and starts work (E405), the state of the work machine 101 transitions from the stopped state S402 to a working state S404. When the work machine 101 is in the working state S404 and stops work (E406), the state of the work machine 101 transitions from the working state S404 to the stopped state S402.

As depicted in FIG. 2, the processing method deciding section 135 decides a machine-body-data transmission process method on the basis of a measurement result of the speed of communication at the communication performance managing section 136 and the state of the work machine 101 set at the state managing section 137.

The remote service processing section 134 controls a process of transmitting machine-body data by the data transmitting/receiving section 133, on the basis of the transmission process method decided by the processing method deciding section 135. The data transmitting/receiving section 133 acquires remote service request information 300 from the managing apparatus 105. The remote service request information 300 is included in a remote service execution command. The remote service request information 300 acquired by the data transmitting/receiving section 133 is stored on the non-volatile memory 112. The processing method deciding section 135 decides a transmission process method on the basis of the remote service request information 300 stored on the non-volatile memory 112.

FIG. 4 is a figure depicting the remote service request information 300. As depicted in FIG. 4, the remote service request information 300 has required speed information 301, a processing profile 302, a choice condition table 303, and processing content detail information 304.

The required speed information 301 defines a required speed (required amount) Tsr which is a data amount per unit time of transmission to the managing apparatus 105 required for the remote service (remote monitoring). The required speed Tsr is a threshold that is determined in advance to decide whether or not to execute a process of transmitting machine-body data according to a normal transmission process method without changing the machine-body-data transmission process method. In the present embodiment, the required speed Tsr is set to 5 [Mbps].

The processing method deciding section 135 determines whether or not a communication speed Tsm measured by the communication performance managing section 136 is equal to or higher than the required speed Tsr. The processing method deciding section 135 chooses the normal transmission process method when the processing method deciding section 135 determines that the communication speed Tsm is equal to or higher than the required speed Tsr. When the processing method deciding section 135 determines that the communication speed Tsm is lower than the required speed Tsr, the processing method deciding section 135 decides whether or not choice conditions defined by the choice condition table 303 are satisfied, and chooses the processing method on the basis of the processing profile 302 defining transmission process methods (hereinafter, also simply referred to as processing methods) corresponding to the choice conditions. Details are explained below.

The processing profile 302 defines a plurality of processing methods (first to fourth processing methods). The first processing method is a processing method for executing a buffering process and a data-reduced transmission process. The second processing method is a processing method for executing the data-reduced transmission process. The third processing method is a processing method for executing a transmission suspension process and the buffering process. The fourth processing method is a processing method for executing the transmission suspension process and a retry request process. In this manner, the processing profile 302 defines a plurality of processing methods which are combinations of the data-reduced transmission process, the buffering process, the transmission suspension process, and the retry request process.

The transmission suspension process is a process of suspending transmission of machine-body data. The retry request process is a process of, when the communication status recovers after the execution of the transmission suspension process and when the speed of communication becomes equal to or higher than the required speed Tsr, transmitting a retry request for resumption of a machine-body-data transmission process to the managing apparatus 105. The buffering process is a process of storing machine-body data on the buffer memory 116 and transmitting the machine-body data stored on the buffer memory 116 to the managing apparatus 105 when the speed of communication has become equal to or higher than the required speed Tsr.

The data-reduced transmission process is a process of eliminating part of machine-body data. In the data-reduced transmission process in the present embodiment, the machine-body data is transmitted while being regularly thinned out at predetermined time intervals. For example, in a transmission process according to the normal transmission process method, the remote service processing section 134 causes the data transmitting/receiving section 133 to transmit machine-body data acquired at predetermined time intervals T0 to the managing apparatus 105. When the data-reduced transmission process is executed, the remote service processing section 134 causes the data transmitting/receiving section 133 to transmit, to the managing apparatus 105, machine-body data acquired at time intervals T1 which are longer than the predetermined time intervals T0 (e.g., time intervals T1 which are twice as long as the predetermined time intervals T0).

The choice condition table 303 defines a plurality of choice conditions (first to fifth choice conditions) used to choose from the plurality of processing methods defined by the processing profile 302. Each of the first to fifth choice conditions is a combination of a plurality of conditions (enable/disable condition, data transmission allowable amount condition, and data storage allowable time condition).

The enable/disable condition is one of the conditions used to determine whether or not execution of the processing methods defined by the processing profile 302 is enabled, and is set for each of the plurality of choice conditions. An enable flag (flag F=1) or a disable flag (flag F=0) is set as the enable/disable condition. The enable/disable condition is updated on the basis of information from the managing apparatus 105.

The data transmission allowable amount condition is one of the conditions that is to be compared with the communication speed (in the present embodiment, the transmission speed, that is, the amount of data per unit time transmitted from the communication terminal 127 to the managing apparatus 105 via the first communication network 109) Tsm of the first communication network 109 measured by the communication performance managing section 136, and that is used to determine whether or not execution of the processing methods defined by the processing profile 302 is enabled.

The data storage allowable time condition is one of the conditions that is to be compared with data storage time Ta and that is used to determine whether or not execution of the processing methods defined by the processing profile 302 is enabled. The processing method deciding section 135 computes the data storage time Ta on the basis of the communication speed Tsm of the first communication network 109 measured by the communication performance managing section 136 and an amount of data (hereinafter, referred to as a data storage amount) Da stored on the buffer memory 116. The data storage time Ta is obtained by dividing the data storage amount Da by the communication speed Tsm (Ta=Da/Tsm).

FIG. 5 is a figure depicting a data storage amount table 500 stored on the non-volatile memory 112. As depicted in FIG. 5, the data storage amount table 500 is a data table having stored thereon the data storage amount Da associated with states of the work machine 101. In the present embodiment, the data storage amount Da in the waiting state S401 and the stopped state S402 is 500 [MByte]. In addition, the data storage amount Da in the travelling state S403 is 100 [MByte], and the data storage amount Da in the working state S404 is 10 [MByte].

The controller 10 of the work machine 101 gives a higher priority to communication of data necessary for control of actuators of the work implement 4, the swing structure 3, and the travel structure 2, than communication of data necessary for execution of the remote service, and executes the communication given the higher priority. The work machine 101 in the working state S404 has the greatest amount of data communication via the second communication network 107 among the four states (S401 to S404). The work machine 101 in the waiting state S401 or the stopped state S402 has the smallest amount of data communication via the second communication network 107 among the four states (S401 to S404). When the work machine 101 is in the travelling state S403, the amount of data communication via the second communication network 107 is greater than that in the waiting state S401 or the stopped state S402 but smaller than that in the working state S404.

In the present embodiment, the data storage amount Da at a time when the work machine 101 is in the working state S404 is smaller than the data storage amount Da at a time when the work machine 101 is in the travelling state S403. In addition, the data storage amount Da at a time when the work machine 101 is in the travelling state S403 is smaller than the data storage amount Da at times when the work machine 101 is in the waiting state S401 or the stopped state S402. That is, the data storage amount Da at times when the work machine 101 is in an operation state (the working state S404 and the travelling state S403) is smaller than the data storage amount Da at a time when the work machine 101 is not an operation state.

As mentioned above, the data storage amount Da is used to compute the data storage time Ta. As mentioned later, the data storage time Ta is lengthened as the data storage amount Da increases. Accordingly, it becomes easier to execute the buffering process. In addition, when the buffering process is executed, time during which the buffering process is executed is shortened as the data storage amount Da decreases. Because of this, situations where the buffering process is executed in the working state S404 and the travelling state S403 can be reduced. As a result, when the work machine 101 is in the working state S404 or the travelling state S403, the communication of data via the second communication network 107 which is necessary for control of the work implement 4, the swing structure 3, and the travel structure 2 is prevented from being interrupted by the buffering process.

As depicted in FIG. 4, the first choice condition is satisfied in the following conditions. That is, the enable flag is set, the communication speed Tsm is equal to or higher than 1 [Mbps] but lower than 5 [Mbps], and the data storage time Ta is equal to or longer than data storage allowable time Ta0 (Ta0=1 [min]). The first choice condition is not satisfied in the following condition. That is, the disable flag is set, the communication speed Tsm is not equal to or higher than 1 [Mbps] and is not lower than 5 [Mbps], or the data storage time Ta is shorter than the data storage allowable time Ta0 (Ta0=1 [min]).

The second choice condition is satisfied in the following conditions. That is, the enable flag is set, the communication speed Tsm is equal to or higher than 1 [Mbps] but lower than 5 [Mbps], and the data storage time Ta is shorter than the data storage allowable time Ta0 (Ta0=1 [min]). The second choice condition is not satisfied in the following condition. That is, the disable flag is set, the communication speed Tsm is not equal to or higher than 1 [Mbps] and is not lower than 5 [Mbps], or the data storage time Ta is equal to or longer than the data storage allowable time Ta0 (Ta0=1 [min]).

The third choice condition is satisfied in the following conditions. That is, the enable flag is set, the communication speed Tsm is equal to or higher than 500 [kbps] but lower than 1 [Mbps], and the data storage time Ta is equal to or longer than the data storage allowable time Ta0 (Ta0=1 [min]). The third choice condition is not satisfied in the following condition. That is, the disable flag is set, the communication speed Tsm is not equal to or higher than 500 [kbps] and is not lower than 1 [Mbps], or the data storage time Ta is shorter than the data storage allowable time Ta0 (Ta0=1 [min]).

The fourth choice condition is satisfied in the following conditions. That is, the enable flag is set, the communication speed Tsm is equal to or higher than the 500 [kbps] but lower than 1 [Mbps], and the data storage time Ta is shorter than the data storage allowable time Ta0 (Ta0=1 [min]). The fourth choice condition is not satisfied in the following condition. That is, the disable flag is set, the communication speed Tsm is not equal to or higher than 500 [kbps] and is not lower than 1 [Mbps], or the data storage time Ta is equal to or longer than the data storage allowable time Ta0 (Ta0=1 [min]).

The fifth choice condition is satisfied when the enable flag is set and the communication speed Tsm is lower than 500 [kbps]. The fifth choice condition is not satisfied when the disable flag is set or the communication speed Tsm is equal to or higher than 500 [kbps].

The processing method deciding section 135 depicted in FIG. 2 decides a processing method on the basis of whether or not the first to fifth choice conditions are satisfied. The processing method deciding section 135 chooses the first processing method when the first choice condition is satisfied, and chooses the second processing method when the second choice condition is satisfied. Further, the processing method deciding section 135 chooses the third processing method when the third choice condition is satisfied, chooses the fourth processing method when either the fourth or the fifth choice condition is satisfied. When none of the first to fifth choice conditions is satisfied, the processing method deciding section 135 chooses a normal processing method, that is, a processing method of executing none of the transmission suspension process, the retry request process, the buffering process, and the data-reduced transmission process.

The processing content detail information 304 is explained by referring to FIG. 4. As depicted in FIG. 4, the processing content detail information 304 has buffer-related data 345 associated with the buffering process, and data-reduction-related data 346 associated with the data-reduced transmission process. The buffer-related data 345 includes a buffer subject table 341 and a buffer amount table 342, and the data-reduction-related data 346 includes a data reduction subject table 343 and a data reduction amount table 344. The buffer subject table 341 defines information for identifying data to be subjected to the buffering process when the buffering process is executed. The buffer amount table 342 defines buffer amounts of the data to be subjected to the buffering process when the buffering process is executed, that is, amounts of the data to be stored on the buffer memory 116 per unit time. The data reduction subject table 343 defines information for identifying data to be subjected to the data-reduced transmission process when the data-reduced transmission process is executed. The data reduction amount table 344 defines data reduction amounts of the data to be subjected to the data-reduced transmission process, that is, reduction amounts of the data per unit time.

The buffer-related data 345 and the data-reduction-related data 346 are stored in association with the first to fourth processing methods. When the first processing method is selected by the processing method deciding section 135, the remote service processing section 134 refers to the processing content detail information 304, sets "Data No. xx" as the subject of the buffering process, and sets the buffer amount to 300 [kbps]. When the first processing method is selected by the processing method deciding section 135, the remote service processing section 134 refers to the processing content detail information 304, sets "Data No. yy" as the subject of the data-reduced transmission process, and sets the data reduction amount to 200 [kbps].

When the second processing method is selected by the processing method deciding section 135, the remote service processing section 134 refers to the processing content detail information 304, sets "Data No. yy" as the subject of the data-reduced transmission process, and sets the data reduction amount to 500 [kbps]. When the third processing method is selected by the processing method deciding section 135, the remote service processing section 134 refers to the processing content detail information 304, sets "Data No. xx" as the subject of the buffering process, and sets the buffer amount to 500 [kbps].

Part of the data of the remote service request information 300 can be changed by operating the input device 161. For example, the input device 161 can set the enable flag or the disable flag as the enable/disable condition in the remote service request information 300. In addition, the input device 161 can select the subject of the buffering process and the subject of the data-reduced transmission process in the processing content detail information 304.

As mentioned above, the information control unit 100 according to the present embodiment executes the transmission process according to the normal transmission process method when the communication speed Tsm is equal to or higher than the predetermined required speed Tsr. On the other hand, when the communication speed Tsm is lower than the required speed Tsr, the information control unit 100 places a functional restriction on the transmission process according to a processing method defined by the remote service request information 300. The information control unit 100 reinforces the functional restriction on the transmission process as the communication speed Tsm lowers. When the work machine 101 is in an operation state, the information control unit 100 reinforces the functional restriction on the transmission process as compared to a case where the work machine 101 is not in an operation state.

Specifically, supposing that the lower limit value of the data transmission allowable amount condition of the first choice condition and the second choice condition is an allowable speed Tsa, when the communication speed Tsm is lower than the required speed Tsr but equal to or higher than the predetermined allowable speed Tsa (1 [Mbps] in the example depicted in FIG. 4), the information control unit 100 executes the data-reduced transmission process of transmitting data while thinning out the data regularly according to the first processing method or the second processing method. When the communication speed Tsm is lower than the allowable speed Tsa, the information control unit 100 executes the transmission suspension process of suspending transmission of data according to the third processing method or the fourth processing method. In this manner, the information control unit 100 reduces an amount of data to be transmitted to the managing apparatus 105 per unit time when the communication speed Tsm is lower than the allowable speed Tsa, as compared to an amount of data to be transmitted to the managing apparatus 105 per unit time when the communication speed Tsm is equal to or higher than the allowable speed Tsa. That is, the controller 10 reinforces the functional restriction on transmission at a time when the communication speed Tsm is lower than the allowable speed Tsa, as compared to the functional restriction on transmission at a time when the communication speed Tsm is equal to or higher than the allowable speed Tsa.

In addition, the information control unit 100 makes a data reduction amount in the data-reduced transmission process executed when the work machine 101 is in an operation state, greater than a data reduction amount in the data-reduced transmission process executed when the work machine 101 is not in an operation state. Thus, the information control unit 100 reinforces the functional restriction on the transmission process when the work machine is in an operation state, as compared to the functional restriction on the transmission process when the work machine is not in an operation state. For example, when the communication speed Tsm is 2 [Mbps] and the work machine 101 is not in an operation state, the data storage time Ta is equal to or longer than the data storage allowable time Ta0 (Ta0=1 [min]). Because of this, the information control unit 100 executes the data-reduced transmission process according to the first processing method such that the data reduction amount of "Data No. yy" becomes 200 [kbps]. In contrast to this, when the communication speed Tsm is 2 [Mbps] and the work machine 101 is in an operation state, the data storage time Ta is shorter than the data storage allowable time Ta0 (Ta0=1 [min]). Because of this, the information control unit 100 executes the data-reduced transmission process according to the second processing method such that the data reduction amount of "Data No. yy" becomes 500 [kbps]. In this manner, the information control unit 100 reduces an amount of data which is predetermined machine-body data to be transmitted to the managing apparatus 105 per unit time when the work machine 101 is in an operation state, as compared to a case where the work machine 101 is not in an operation state. That is, the information control unit 100 reinforces the functional restriction on the transmission process when the work machine 101 is in an operation state, as compared to the functional restriction on the transmission process when the work machine 101 is not in an operation state.

The information control unit 100 executes the buffering process of storing machine-body data (Data No. xx) on the buffer memory 116 when the communication speed Tsm is lower than the required speed Tsr and the data storage time Ta is equal to or longer than the predetermined data storage allowable time Ta0, and transmitting the data (Data No. xx) stored on the buffer memory 116 to the managing apparatus 105 when the communication speed Tsm has become equal to or higher than the required speed Tsr. As mentioned above, the data storage amount Da at a time when the work machine 101 is in an operation state is smaller than the data storage amount Da at a time when the work machine 101 is not in an operation state (see FIG. 5). Because of this, it is possible to reduce the frequency of execution of the buffering process when the work machine 101 is in an operation state.

For example, the information control unit 100 executes the buffering process when it executes a transmission process according to the first processing method. In the buffering process, transmission of machine-body data to be subjected to the buffering process is not performed until the communication status recovers, and transmission of the machine-body data stored on the buffer memory 116 is performed after the communication status has recovered. In contrast to this, the information control unit 100 does not execute the buffering process when it executes a transmission process according to the second processing method. Because of this, the total amount of data to be transmitted from the information control unit 100 to the managing apparatus 105 when the second processing method is chosen is smaller than the total amount of data to be transmitted when the first processing method is chosen. In this manner, the information control unit 100 reinforces the functional restriction on the transmission process when the work machine 101 is in an operation state, as compared to the functional restriction on the transmission process when the work machine 101 is not in an operation state. In addition, it can also be said that the information control unit 100 is placing a functional restriction on the buffering process by reducing the amount of data stored on the buffer memory 116 when the work machine 101 is an operation state, as compared to a case where the work machine 101 is not in an operation state. Accordingly, the communication of the data necessary for control of the operations of the work implement 4, the swing structure 3, and the travel structure 2 of the work machine 101 can be prevented from being interrupted by the buffering process, and accordingly, the work machine 101 can operate appropriately.

The information control unit 100 makes the buffer amount (500 [kbps]) in the buffering process executed along with the transmission suspension process, greater than the buffer amount (300 [kbps]) in the buffering process executed along with the data-reduced transmission process. Accordingly, it is possible to increase the amount of data to be transmitted when the communication status recovers after the communication status has deteriorated and the transmission suspension process and the buffering process have been executed.

Figure 6:
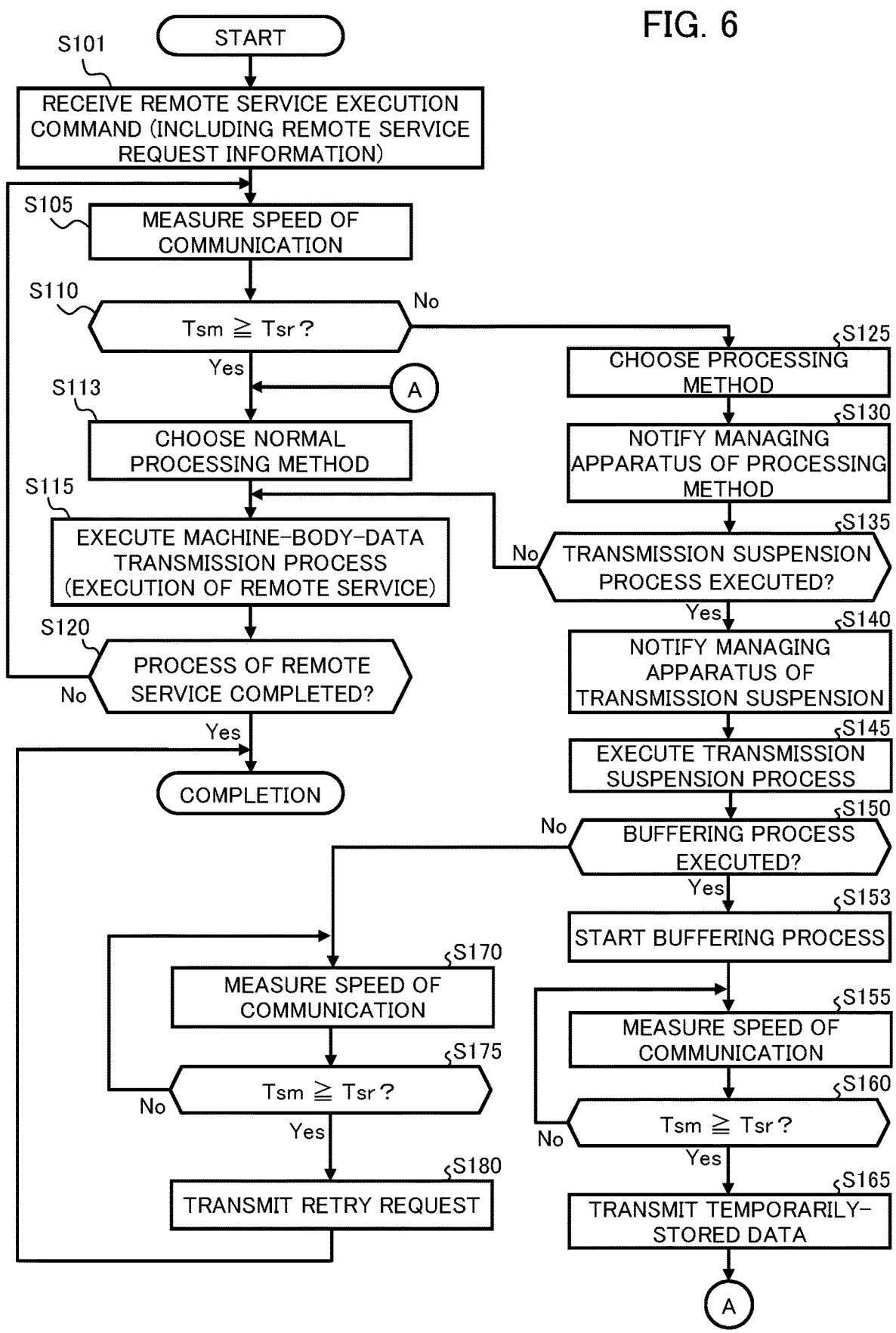
FIG. 6 is a flowchart depicting the contents of a transmission process executed by the information control unit.

The contents of a transmission process executed by the information control unit 100 is explained by referring to FIG. 6. The process of a flowchart depicted in FIG. 6 is started when the ignition switch of the work machine 101 is turned on and it becomes possible for the communication terminal 127 to wirelessly communicate with the managing apparatus 105 via the first communication network 109.

As depicted in FIG. 6, when the information control unit 100 receives a remote service execution command (including the remote service request information 300) from the managing apparatus 105 in Step S101, the procedure proceeds to Step S105. In Step S105, the information control unit 100 measures the communication speed Tsm of the first communication network 109, and the procedure proceeds to Step S110.

In Step S110, the information control unit 100 determines whether or not the communication speed Tsm of the first communication network 109 measured in Step S105 is equal to or higher than the required speed Tsr. When it is determined in Step S110 that the communication speed Tsm is equal to or higher than the required speed Tsr, the procedure proceeds to Step S113. When it is determined that the communication speed Tsm is lower than the required speed Tsr, the procedure proceeds to Step S125.

In Step S113, the information control unit 100 chooses the normal processing method, and the procedure proceeds to Step S115.

In Step S115, the information control unit 100 executes a transmission process of transmitting machine-body data according to the currently chosen processing method, and the procedure proceeds to Step S120. That is, the information control unit 100 executes the remote service (remote monitoring) according to the currently chosen processing method.

In Step S120, the information control unit 100 determines whether or not a process necessary for the remote service has been completed. When it is determined in Step S120 that the process necessary for the remote service has been completed, the process depicted in the flowchart of FIG. 6 is ended. For example, when the information control unit 100 has received a command for ending the remote service from the managing apparatus 105, it determines that the process necessary for the remote service has been completed. In addition, when an end time of the remote service is registered in the remote service request information 300 and the current time has reached the end time, the information control unit 100 determines that the process necessary for the remote service has been completed. When it is determined in Step S120 that the process necessary for the remote service has not been completed, the information control unit 100 continuously executes the remote service until a predetermined length of time elapses (i.e., repetitively executes the machine-body-data transmission process), and the procedure returns to Step S105 after the predetermined length of time has elapsed.

When it is determined in Step S110 that the communication speed Tsm is lower than the required speed Tsr, the procedure proceeds to Step S125, and a processing method choosing process is executed. In the processing method choosing process (Step S125), the information control unit 100 determines whether or not any of the plurality of choice conditions defined by the remote service request information 300 is satisfied, on the basis of the communication speed Tsm of the first communication network 109 and the state of the work machine 101, and chooses a remote service processing method (i.e., a processing method for a machine-body-data transmission process) on the basis of a result of the determination.

The information control unit 100 determines whether or not each of the first to fifth choice conditions is satisfied. The information control unit 100 chooses the first processing method when it is determined that the first choice condition is satisfied. The information control unit 100 chooses the second processing method when it is determined that the second choice condition is satisfied. The information control unit 100 chooses the third processing method when it is determined that the third choice condition is satisfied. The information control unit 100 chooses the fourth processing method when it is determined that either the fourth or the fifth choice condition is satisfied.

Note that the information control unit 100 chooses the normal processing method when it is determined that none of the first to fifth choice conditions are satisfied. When the processing method choosing process (Step S125) is completed, the procedure proceeds to Step S130.

In Step S130, the information control unit 100 transmits information regarding the processing method chosen in Step S125 to the managing apparatus 105, and the procedure proceeds to Step S135. Upon reception of the information regarding the processing method chosen at the work machine 101, the managing apparatus 105 causes the display screen 166 of the display device 165 to display an image representing the processing method chosen at the work machine 101.

In Step S135, the information control unit 100 determines whether or not the processing method chosen in Step S125 includes the transmission suspension process. When it is determined in Step S125 that the chosen processing method does not include the transmission suspension process, the procedure proceeds to Step S115. In Step S115, the information control unit 100 executes a machine-body-data transmission process according to the processing method chosen in Step S125. When it is determined in Step S125 that the chosen processing method includes the transmission suspension process, the procedure proceeds to Step S140.

In Step S140, the information control unit 100 transmits information indicating that the transmission suspension process is to be executed, to the managing apparatus 105, and the procedure proceeds to Step S145. Upon reception of the information indicating that the transmission suspension process is to be executed from the work machine 101, the managing apparatus 105 causes the display screen 166 of the display device 165 to display an image representing that the transmission suspension process is to be executed at the work machine 101.

In Step S145, the information control unit 100 executes the transmission suspension process, and the procedure proceeds to Step S150. In Step S150, the information control unit 100 determines whether or not the processing method chosen in Step S125 includes the buffering process. When it is determined in Step S150 that the chosen processing method includes the buffering process, the procedure proceeds to Step S153. When it is determined that the chosen processing method does not include the buffering process, the procedure proceeds to Step S170.

In Step S153, the information control unit 100 starts storage of machine-body data "Data No. yy" on the buffer memory 116, and the procedure proceeds to Step S155.

In Step S155, the information control unit 100 measures the communication speed Tsm of the first communication network 109, and the procedure proceeds to Step S160. In Step S160, the information control unit 100 determines whether or not the communication speed Tsm of the first communication network 109 measured in Step S155 is equal to or higher than the required speed Tsr. When it is determined in Step S160 that the communication speed Tsm is equal to or higher than the required speed Tsr, the procedure proceeds to Step S165. When it is determined that the communication speed Tsm is lower than the required speed Tsr, the procedure returns to Step S155.

In Step S165, the information control unit 100 ends storage of the machine-body data "Data No. yy" on the buffer memory 116 and transmits the machine-body data "Data No. yy" stored on the buffer memory 116 to the managing apparatus 105, and the procedure proceeds to Step S113.

Note that, although not depicted, processes similar to Steps S150 and S153 are executed in Step S115 when the first processing method is chosen in Step S125. Further, when it is determined in Step S120 that the process necessary for the remote service has not been completed, the information control unit 100 continuously executes the remote service according to the first processing method until the predetermined length of time elapses, and the procedure returns to Step S105 after the predetermined length of time has elapsed. When the communication speed Tsm measured in Step S105 has become equal to or higher than the required speed Tsr, the normal processing method is chosen after a process similar to Step S165 is executed in Step S113, and the procedure proceeds to Step S115.

In Step S170, the information control unit 100 measures the communication speed Tsm of the first communication network 109, and the procedure proceeds to Step S175. In Step S175, the information control unit 100 determines whether or not the communication speed Tsm of the first communication network 109 measured in Step S170 is equal to or higher than the required speed Tsr. When it is determined in Step S175 that the communication speed Tsm is equal to or higher than the required speed Tsr, the procedure proceeds to Step S180. When it is determined that the communication speed Tsm is lower than the required speed Tsr, the procedure returns to Step S170.

In Step S180, the information control unit 100 transmits a retry request to the managing apparatus 105, and the process depicted in the flowchart of FIG. 6 is ended. Upon reception of the retry request, the managing apparatus 105 causes the display screen 166 of the display device 165 to display an image representing that the retry request has been received. When the input device 161 is operated by a manager and a resumption command (remote monitoring execution command) including the remote service request information 300 is transmitted from the managing apparatus 105, the information control unit 100 receives the remote service request information 300 (Step S101) and resumes the remote service (remote monitoring).

Figure 7A:
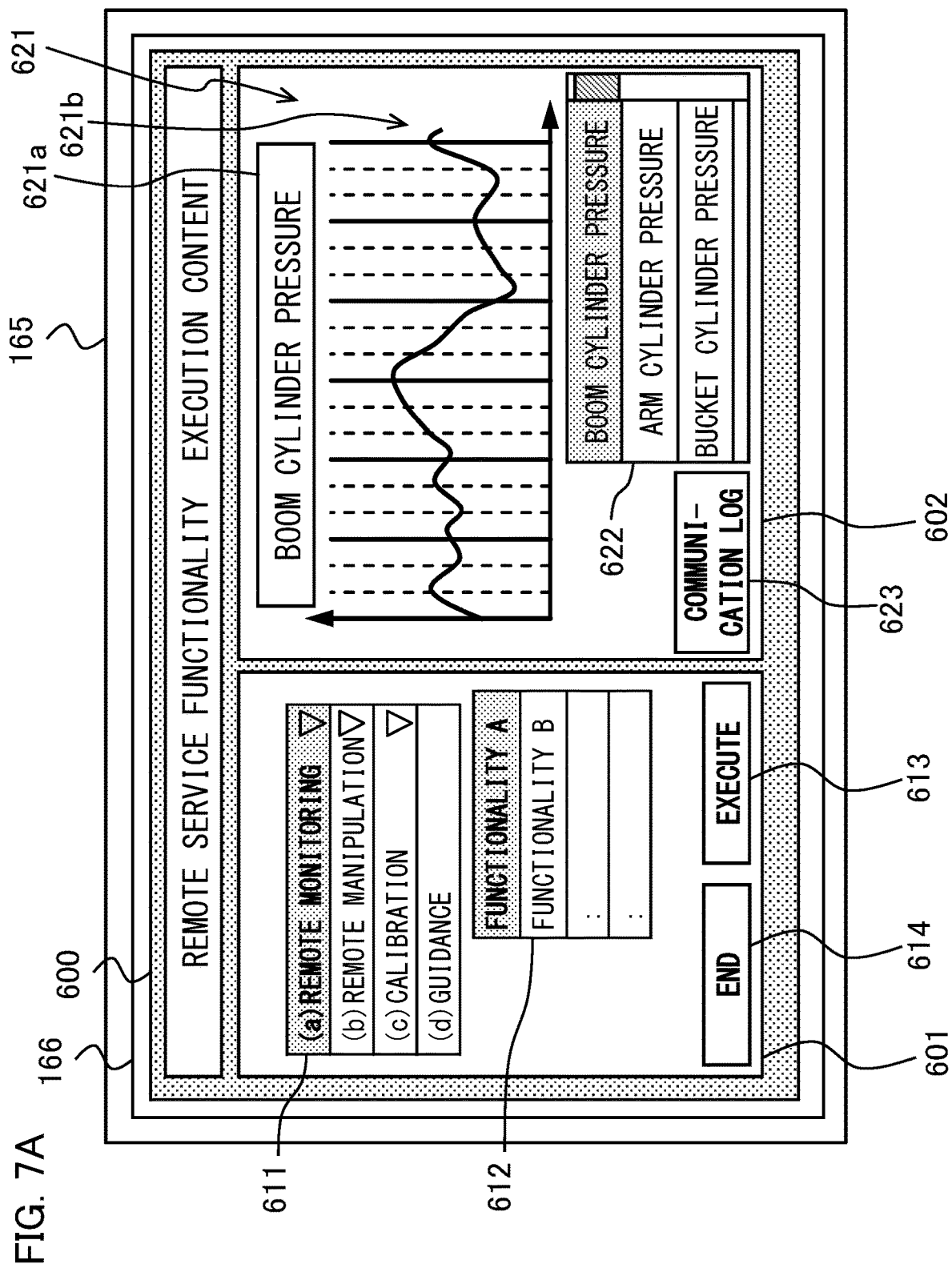
FIG. 7A is a figure depicting an example of a screen displayed on a display screen of a display device, and depicts an example in which a boom cylinder pressure is displayed as machine-body data.
Figure 8:
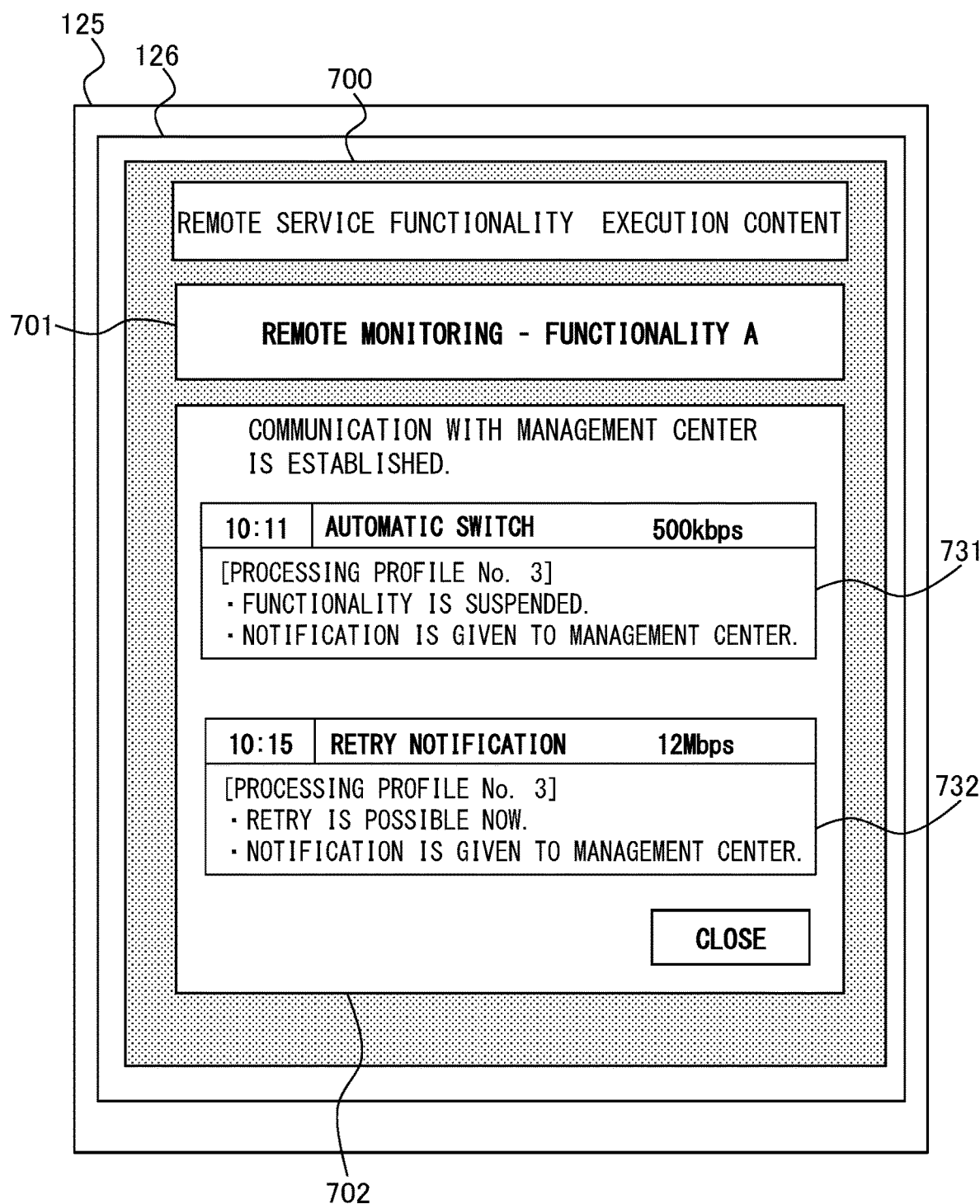
FIG. 8 is a figure depicting an example of a screen displayed on a display screen of machine-mounted display input equipment.

An example of the operation of the managing system 1 according to the present embodiment is now explained. FIG. 7A and FIG. 7B are figures depicting examples of screens displayed on the display screen 166 of the display device 165. FIG. 7A depicts an example in which a boom cylinder pressure is displayed as machine-body data, and FIG. 7B depicts an example in which a communication log is displayed. FIG. 8 is a figure depicting an example of a screen displayed on the display screen 126 of the machine-mounted display input equipment 125.

A remote service selection area 601 is displayed on the display screen 166 of the display device 165, as depicted in FIG. 7A, when a remote service application installed on the managing apparatus 105 is executed. The remote service selection area 601 has a remote service selection area 611 for selecting one of a plurality of remote services (remote monitoring, remote manipulation, calibration, guidance, etc.), a functionality selection area 612 for selecting one of a plurality of functionalities set for each of the plurality of remote services, an execute button 613 for executing the selected remote service, and an end button 614 for ending a remote service being executed.

A manager operates the input device 161 to select remote monitoring from the plurality of remote services in the remote service selection area 601. Accordingly, the functionality selection area 612 is displayed, and selection of either a functionality A or a functionality B of the remote monitoring becomes possible. The manager selects the functionality A from the plurality of functionalities in the functionality selection area 612 by using the input device 161, and operates the execute button 613 to thereby transmit a remote monitoring execution command from the managing apparatus 105.

The managing apparatus 105 transmits the remote service request information 300 stored on the non-volatile memory 152 to the information control unit 100 of the work machine 101. The information control unit 100 starts measurement of the communication speed Tsm of the first communication network 109 upon reception of the remote service request information 300, and chooses a processing method on the basis of the remote service request information 300, the measured communication speed Tsm, and the operation state of the work machine 101.

The information control unit 100 transmits machine-body data according to the normal transmission process method when the communication status is good and the communication speed Tsm is equal to or higher than the required speed Tsr. When the machine-body data is transmitted from the information control unit 100 to the managing apparatus 105, the managing apparatus 105 causes a machine-body data display area 602 on the display screen 166 of the display device 165 to display a machine-body data image 621 representing the machine-body data. The machine-body data image 621 has a type display area 621a that displays a machine-body data type (a boom cylinder pressure in the example depicted in the figure), and a graph 621b that depicts temporal changes of the machine-body data.

The machine-body data display area 602 displays a type selection area 622 for selecting machine-body data to be displayed, and a communication log button 623 for causing a communication log to be displayed. By operating the input device 161, the manager can select machine-body data that the manager intends to display on the display screen 166 of the display device 165, from a plurality of pieces of machine-body data in the type selection area 622. A communication log display area 603 is displayed on the display screen 166, as depicted in FIG. 7B, when the manager operates the communication log button 623 by using the input device 161.

If the communication status of a communication antenna of the work machine 101 deteriorates and the communication speed Tsm has become lower than the required speed Tsr due to a weather-related situational change that occurs when the air above the work machine 101 is covered with thick clouds, for example, a functional restriction is placed on transmission of machine-body data from the information control unit 100 to the managing apparatus 105. Note that a specific example is explained below supposing that the enable/disable conditions of all of the first to fifth processing methods are set to be enabled.

When the communication speed Tsm lowers to 2 [Mbps], as depicted in FIG. 4, the first or second processing method is chosen, and the data-reduced transmission process of transmitting machine-body data while thinning out the machine-body data is executed. That is, a functional restriction is placed on transmission. Here, when the work machine 101 is in a waiting state or a stopped state, the data storage amount Da is 500 [MByte] (see FIG. 5), and accordingly, the data storage time Ta is 250 [s]. Because of this, the information control unit 100 chooses the first processing method, executes the data-reduced transmission process of transmitting the machine-body data while thinning out the machine-body data such that the data reduction amount becomes 200 [kbps], and also executes the buffering process of storing the machine-body data on the buffer memory 116 temporarily such that the buffer amount becomes 300 [kbps].

When the work machine 101 is in a travelling state, the data storage amount Da is 100 [MByte] (see FIG. 5), and accordingly, the data storage time Ta is 50 s. Because of this, the information control unit 100 chooses the second processing method, and executes the data-reduced transmission process of transmitting the machine-body data while thinning out the machine-body data such that the data reduction amount becomes 500 [kbps]. In addition, when the work machine 101 is in a working state, the data storage amount Da is 10 [MByte] (see FIG. 5), and accordingly, the data storage time Ta is 5 [s]. Because of this, the information control unit 100 chooses the second processing method, and executes the data-reduced transmission process of transmitting the machine-body data while thinning out the machine-body data such that the data reduction amount becomes 500 [kbps].

In this manner, in the present embodiment, when the work machine 101 is in an operation state (travelling state or working state), the data reduction amount is large, and the functional restriction on the transmission process is reinforced, as compared to the data reduction amount and the functional restriction when the work machine 101 is not in an operation state (waiting state, stopped state). When the communication status recovers and the communication speed Tsm becomes equal to or higher than the required speed Tr (5 [Mbps]) after the first processing method has been chosen and the buffering process has been executed, the machine-body data having been stored on the buffer memory 116 is transmitted to the managing apparatus 105, and thereafter, the transmission process is executed by the normal processing method.

When the communication status of the communication antenna of the work machine 101 deteriorates and the speed of communication lowers to 500 [kbps], the third or fourth processing method is chosen, and the machine-body-data transmission process is suspended. Prior to the execution of the transmission suspension process, the information control unit 100 transmits notification information indicating that the transmission suspension process is to be executed, to the managing apparatus 105. Upon reception of the notification information indicating that the transmission suspension process is to be executed, the managing apparatus 105 causes the communication log display area 603 on the display screen 166 of the display device 165 to display an image (transmission suspension notification image) 631 representing the notification information, as depicted in FIG. 7B. In the present embodiment, the transmission suspension notification image 631 includes information regarding the notification time, the speed of communication, and the processing method, as well as a message for notifying that the remote service functionality has been suspended and a message prompting to wait until a retry is notified.

When the work machine 101 is in a waiting state or a stopped state, the data storage amount Da is 500 [MByte] (see FIG. 5), and accordingly, the data storage time Ta is 1000 [s]. Because of this, as depicted in FIG. 4, the information control unit 100 chooses the third processing method, and executes the buffering process of storing the machine-body data on the buffer memory 116 temporarily such that the buffer amount becomes 500 [kbps]. When the work machine 101 is in a travelling state, the data storage amount Da is 100 [MByte] (see FIG. 5), and accordingly, the data storage time Ta is 200 [s]. Because of this, the information control unit 100 chooses the third processing method, and executes the buffering process of storing the machine-body data on the buffer memory 116 temporarily such that the buffer amount becomes 500 [kbps].

When the communication status recovers and the communication speed Tsm becomes equal to or higher than the required speed Tsr (5 [Mbps]) after the third processing method has been chosen and the buffering process has been executed, the machine-body data having been stored on the buffer memory 116 is transmitted to the managing apparatus 105.

In contrast to this, when the work machine 101 is in a working state, the data storage amount Da is 10 [MByte] (see FIG. 5), and accordingly, the data storage time Ta is 20 [s]. Because of this, the information control unit 100 chooses the fourth processing method, and executes the transmission suspension process without executing the buffering process. When the communication status recovers and the communication speed Tsm becomes equal to or higher than the required speed Tsr (5 [Mbps]) after the fourth processing method has been chosen and the transmission suspension process has been executed, the information control unit 100 transmits a retry request to the managing apparatus 105.

The managing apparatus 105 causes, upon reception of the retry request, the communication log display area 603 on the display screen 166 of the display device 165 to display an image (retry notification image) 632 representing that the retry request has been received, as depicted in FIG. 7B. In the present embodiment, the retry notification image 632 includes information regarding the notification time, the speed of communication, and the processing method which is executed immediately before the recovery of the communication status, as well as a message for notifying that a retry is possible. When a manager operates the execute button 613 for a remote service by using the input device 161, a remote service resumption command (including the remote service request information 300) is transmitted to the information control unit 100. As a result, the remote service is resumed.

Note that, as depicted in FIG. 8, the display screen 126 of the machine-mounted display input equipment 125 displays a service content display area 701 that displays information representing the type of the remote service, and a communication log display area 702. The communication log display area 702 displays a transmission suspension notification image 731 and a retry notification image 732. In the present embodiment, similarly to the transmission suspension notification image 631, the transmission suspension notification image 731 includes information regarding the notification time, the speed of communication, and the processing method, as well as a message for notifying that the remote service functionality has been suspended, and further includes a message indicating that the suspension of the remote service functionality has been notified to the managing apparatus 105. In addition, similarly to the retry notification image 632, the retry notification image 732 includes information regarding the notification time, the speed of communication, and the processing method which is executed immediately before the recovery of the communication status, as well as a message for notifying that a retry is possible, and further includes a message indicating that a retry request has been transmitted to the managing apparatus 105. Accordingly, an operator operating the work machine 101 can recognize what kind of remote service is being executed currently, and can also recognize changes in the communication status and the contents of a functional restriction on the remote service due to the changes in the communication status (currently set processing method).

The embodiment mentioned above attains the following effects and advantages.

(1) The work machine 101 includes the body 5, the work implement 4 attached to the body 5, and the controller 10 that executes a transmission process of transmitting machine-body data to the managing apparatus (external apparatus) 105 installed outside the body 5. The controller 10 measures the communication speed Tsm with the managing apparatus 105 and places a functional restriction on the transmission process when the communication speed Tsm is lower than the predetermined required speed Tsr. The controller 10 reinforces the functional restriction on the transmission process as the communication speed Tsm lowers, and reinforces the functional restriction on the transmission process when the work machine 101 is in an operation state, as compared to a case where the work machine 101 is not in the operation state.

In the present embodiment, the controller 10 executes the data-reduced transmission process of transmitting the machine-body data while thinning out the machine-body data, when the communication speed Tsm is lower than the required speed Tsr but equal to or higher than the predetermined allowable speed Tsa, and reinforces the functional restriction on the transmission process as the communication speed Tsm lowers, by executing the transmission suspension process of suspending the transmission of the machine-body data when the communication speed Tsm is lower than the allowable speed Tsa.

In the present embodiment, the controller 10 makes a data reduction amount in the data-reduced transmission process executed when the work machine 101 is in the operation state, greater than a data reduction amount in the data-reduced transmission process executed when the work machine 101 is not in the operation state, to thereby reinforce the functional restriction on the transmission process when the work machine is in the operation state, as compared to a case where the work machine is not in the operation state.

In this manner, in the present embodiment, the functional restriction is placed on the transmission process at a restriction level according to the communication status and the state of the work machine 101. Because of this, for example, when the communication status has deteriorated and the work machine 101 is in the operation state or when the communication status has significantly deteriorated or in other similar situations, continuation of the transmission process by the normal processing method is prevented. If the machine-body-data transmission process according to the normal processing method is continued in a state where the communication status has deteriorated and the work machine 101 is in the operation state or where the communication status has significantly deteriorated, for example, a defect of machine-body data or the like may occur, and the transmitted machine-body data may become instable, for example. Thus, there is a fear that the machine-body data cannot be transmitted to the managing apparatus 105 appropriately. In contrast to this, according to the present embodiment, as mentioned above, the functional restriction is placed on the transmission process at a restriction level according to the communication status and the state of the work machine 101, and accordingly, information regarding the work machine 101 can be transmitted to the managing apparatus 105 appropriately. Note that, in the data-reduced transmission process, the machine-body data is transmitted while being thinned out regularly according to a predetermined processing method. That is, the information control unit 100 according to the present embodiment can transmit machine-body data to the managing apparatus 105 stably in the data-reduced transmission process, and accordingly, a manager can perform monitoring of the work machines 101 continuously.

(2) The controller 10 computes the data storage time Ta on the basis of the communication speed Tsm and the data storage amount Da associated with the state of the work machine 101. The controller 10 executes the buffering process of storing machine-body data on the buffer memory 116 when the communication speed Tsm is lower than the required speed Tsr and the data storage time Ta is equal to or longer than the predetermined data storage allowable time Ta0, and transmitting the data stored on the buffer memory 116 to the managing apparatus 105 when the communication speed Tsm has become equal to or higher than the required speed Tsr. The data storage amount Da at a time when the work machine 101 is in the operation state is smaller than the data storage amount Da at a time when the work machine 101 is not in the operation state.

Accordingly, the transmission amount of machine-body data at a time when the communication status has deteriorated can be reduced. In addition, when the communication status recovers, the data stored on the buffer memory 116 is transmitted to the managing apparatus 105, and accordingly, the machine-body data at the time when the communication status has deteriorated can be displayed on the display screen 166 of the display device 165 appropriately. Since the data storage amount Da at a time when the work machine 101 is in the operation state is smaller than the data storage amount Da at a time when the work machine 101 is not in the operation state, the frequency of execution of the buffering process at a time when the work machine 101 is in the operation state can be reduced. Accordingly, the communication of the data necessary for control of the operations of the work implement 4, the swing structure 3, and the travel structure 2 of the work machine 101 can be prevented from being interrupted by the buffering process, and accordingly, the work machine 101 can operate appropriately.

(3) The controller 10 makes the buffer amount (500 [kbps]) in the buffering process executed along with the transmission suspension process greater than the buffer amount (300 [kbps]) in the buffering process executed along with the data-reduced transmission process (see FIG. 4). Accordingly, it is possible to increase the amount of data to be transmitted when the communication status recovers after the communication status has deteriorated and the transmission suspension process and the buffering process have been executed.

(4) The operation state does not include the waiting state where the engine (power source) 19 of the work machine 101 is stopped and the stopped state where the engine (power source) 19 of the work machine 101 is in operation but the travel structure 2 and the work implement 4 are stopped, but includes the travelling state where the travel structure 2 is in operation and the working state where the work implement 4 is in operation. The data storage amount Da at a time when the work machine 101 is in the working state is smaller than the data storage amount Da at a time when the work machine 101 is in the travelling state (see FIG. 5). Accordingly, the communication of the data necessary for control of the operations of the work implement 4 and the swing structure 3 of the work machine 101 can effectively be prevented from being interrupted by the buffering process, and work can be performed by the work machine 101 appropriately. In addition, the communication of the data necessary for control of the operation of the travel structure 2 of the work machine 101 is smaller than that when the work machine 101 is in the working state. Because of this, by making the frequency of execution of the buffering process at a time when the work machine is in the travelling state, higher than the frequency of execution of the buffering process at a time when the work machine is the working state, it is possible to increase the amount of data to be transmitted when the communication status recovers after the buffering process has been executed.

(5) The controller 10 transmits a retry request for resumption of the transmission process to the managing apparatus 105 when the communication speed Tsm becomes equal to or higher than the required speed Tsr after the transmission suspension process has been executed. The transmission of the machine-body data can be suspended early when the communication status has deteriorated, and resumption of the transmission of the machine-body data can be performed appropriately early when the communication status has recovered.

(6) The controller 10 acquires, from the managing apparatus 105, the required speed Tsr, the processing profile 302 defining the plurality of processing methods, and the plurality of choice conditions used to choose from the plurality of processing methods defined by the processing profile 302. The controller 10 determines whether or not the plurality of choice conditions are satisfied, when the communication speed Tsm is lower than the required speed Tsr, and chooses a processing method on the basis of a result of the determination. The controller 10 executes a transmission process according to the chosen processing method.

In the present embodiment, the processing profile 302 defines the plurality of processing methods which are combinations of: the data-reduced transmission process of transmitting the machine-body data while thinning out the machine-body data; the buffering process of storing the machine-body data on the buffer memory 116 and transmitting the machine-body data stored on the buffer memory 116 to the managing apparatus 105 when the communication speed Tsm has become equal to or higher than the required speed Tsr; the transmission suspension process of suspending the transmission of the machine-body data; and the retry request process of transmitting a retry request for resumption of the transmission process to the managing apparatus 105 when the communication speed Tsm becomes equal to or higher than the required speed Tsr after the transmission suspension process has been executed.

The controller 10 acquires the data-reduction-related data 346 associated with the data-reduced transmission process and the buffer-related data 345 associated with the buffering process from the managing apparatus 105. The data-reduction-related data 346 defines information that identifies data to be subjected to the data-reduced transmission process, and data reduction amounts in the data-reduced transmission process (see FIG. 4). The buffer-related data 345 defines information that identifies data to be subjected to the buffering process, and buffer amounts in the buffering process (see FIG. 4).

Accordingly, it becomes easier to update the required speed Tsr, the processing methods defined by the processing profile 302, the plurality of choice conditions, and the like. As a result, the controller 10 can transmit machine-body data by a processing method that meets a demand of a manager, when the communication status has deteriorated.

Modification examples like the ones mentioned below are also included in the scope of the present invention, and it is also possible to combine configuration depicted in the modification examples and the configuration explained in the embodiment mentioned above, and combine configuration explained in different ones of the modification examples below, for example.

First Modification Example

Although, in the example explained in the embodiment described above, the remote service request information 300 is transmitted from the managing apparatus 105 to the work machine 101 and stored on the non-volatile memory 112 of the work machine 101, the present invention is not limited to this. The remote service request information 300 may be stored in advance on the non-volatile memory 112 of the work machine 101.

Second Modification Example

Although, in the example explained in the embodiment described above, the controller 10 computes the data storage time Ta on the basis of the communication speed Tsm and the data storage amount Da associated with the state of the work machine 101 and executes the buffering process when the communication speed Tsm is lower than the required speed Tsr and the data storage time Ta is equal to or longer than the predetermined data storage allowable time Ta0, the present invention is not limited to this. As depicted in FIG. 9, a choice condition table 303B may define state conditions of the work machine 101. In the choice condition table 303B, the first and third choice conditions include that the work machine 101 is not in an operation state, and the second and fourth choice conditions include that the work machine 101 is in an operation state. Accordingly, in a state where the communication speed Tsm is 2 [Mbps] and the enable flag is set as the enable/disable condition, for example, the first processing method is selected when the work machine 101 is not in an operation state, and the second processing method is selected when the work machine 101 is in an operation state. In addition, in a state where the communication speed Tsm is 1 [Mbps] and the enable flag is set as the enable/disable condition, for example, the third processing method is selected when the work machine 101 is not in an operation state, and the fourth processing method is selected when the work machine 101 is in an operation state. Accordingly, the communication of the data necessary for control of the operations of the work implement 4, the swing structure 3, and the travel structure 2 of the work machine 101 can be prevented from being interrupted by the buffering process, and accordingly, the work machine 101 can operate appropriately.

Third Modification Example

Although the remote service is remote monitoring in the example explained in the embodiment described above, the present invention is not limited to this. It is sufficient if the remote service involves at least execution of a transmission process of transmitting machine-body data from the work machine 101 to the managing apparatus 105 such as remote manipulation or calibration (parameter adjustment).

Figure 10:
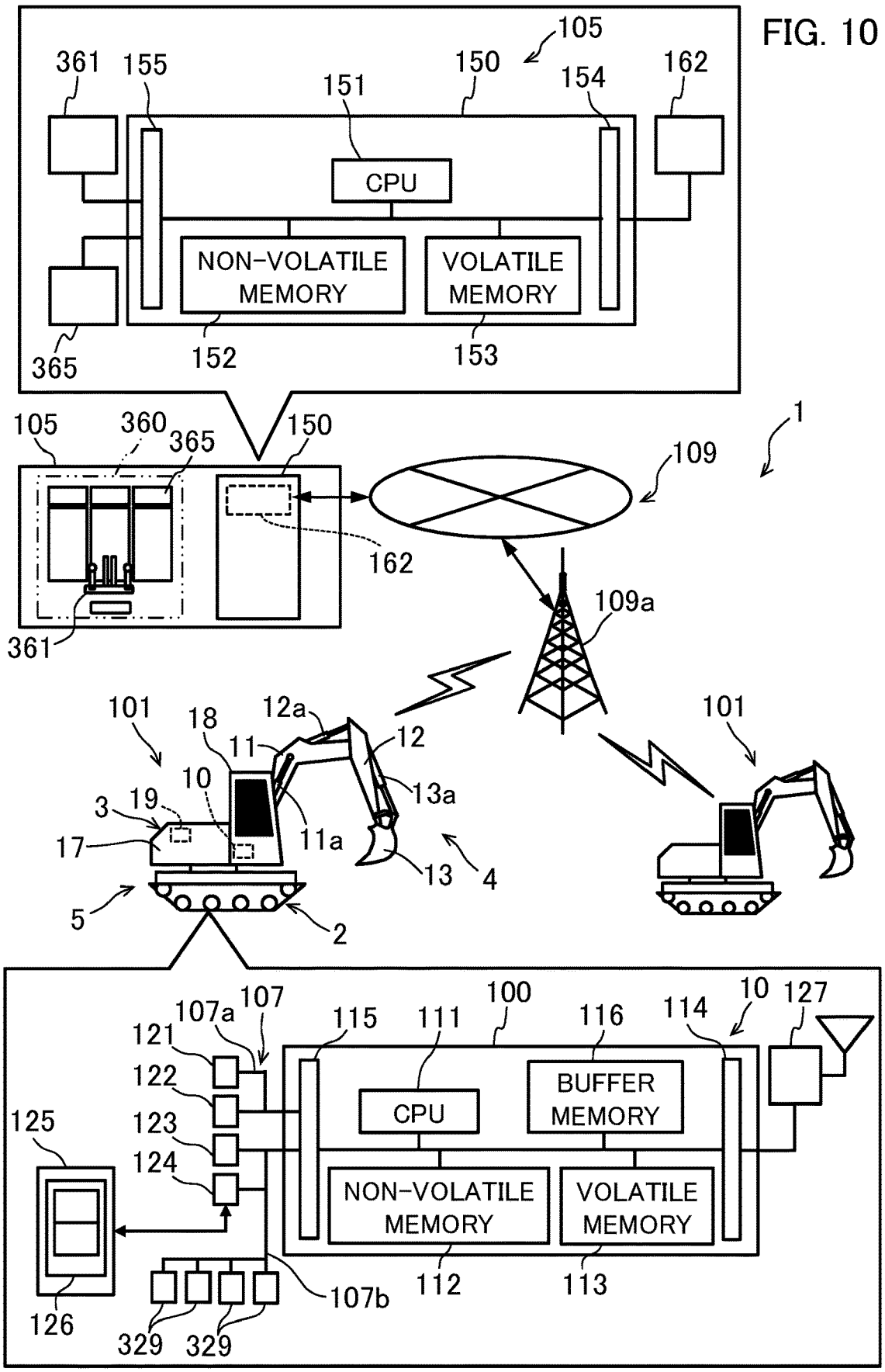
FIG. 10 is a figure depicting a managing system according to a third modification example.

FIG. 10 is a figure depicting a managing system 1 according to a third modification example. As depicted in FIG. 10, the managing apparatus 105 includes a remote manipulating apparatus 360 connected to the management server 150. Note that the remote manipulating apparatus 360 may exchange information with the management server 150 via the first communication network 109. The remote manipulating apparatus 360 includes a display device 365 that displays, on a display screen, machine-body data (including image data) transmitted from the work machines 101, and an operation device 361 that outputs operation commands for the work implement 4, the travel structure 2, and the swing structure 3.

Each of the work machines 101 includes a plurality of image-capturing devices 329 connected to the second communication network 107. For example, each of the image-capturing devices 329 is a wide-angle video camera that excels in durability and weather resistance and includes a wide-angle lens and an imaging element such as a CCD (Charge-Coupled Device) or a CMOS (Complementary Metal Oxide Semiconductor). The plurality of image-capturing devices 329 are attached to the swing structure 3 and capture respective images in the front, rear, left, and right directions from the swing structure 3. The information control unit 100 transmits data of images captured by the image-capturing devices 329 (hereinafter, also referred to as captured image data) as machine-body data to the managing apparatus 105 via the first communication network 109. The managing apparatus 105 outputs the received captured image data to the display device 365. The display device 365 causes the display screen to display the input captured image data.

The management server 150 of the managing apparatus 105 receives input of a command for remotely operating the work machine 101 (hereinafter, referred to as a remote manipulation command) from the operation device 361. The managing apparatus 105 transmits the input remote manipulation command to the information control unit 100 via the first communication network 109. Upon reception of the remote manipulation command from the managing apparatus 105 via the first communication network 109, the information control unit 100 outputs the remote manipulation command to the work control unit 122 via the second communication network 107. The work control unit 122 controls the operations of the work implement 4, the travel structure 2, and the swing structure 3 on the basis of the remote manipulation command input from the information control unit 100 via the second communication network 107.

In the present modification example, when the communication status deteriorates and the communication speed Tsm becomes 2 [Mbps], for example, the frame rate of image data captured by the image-capturing device 329 is lowered, that is, the captured image data as machine-body data is transmitted to the managing apparatus 105 while being thinned out regularly at predetermined time intervals. Accordingly, the remote manipulation of the work machine 101 can be continued, and accordingly, increases of inactive time of the work machine 101 caused by deterioration of the communication status can be inhibited.

When the communication status deteriorates further and the communication speed Tsm becomes 500 [kbps], for example, the controller 10 suspends transmission of the captured image data and reception of remote manipulation commands. Here, if transmission of the captured image data is not suspended, there is a fear that images (moving images) displayed on the display device 365 may become instable due to occurrence of irregular lack, delay, or the like of captured image data transmitted to the remote manipulating apparatus 360. If remote manipulation is continued in such a situation undesirably, there is a fear that appropriate work cannot be performed and that the work needs to be redone after the communication status has recovered. In the present embodiment, when the communication speed Tsm has become lower than the allowable speed Tsa, transmission of the captured image data is suspended, and a retry request is transmitted to the managing apparatus 105 after the communication status has recovered. Because of this, it is possible to prevent continuation of remote manipulation by an operator when the communication status has significantly deteriorated, preventing a situation where the work needs to be redone.

Fourth Modification Example

Although the work machines 101 are crawler-type hydraulic excavators in the example explained in the embodiment described above, the present invention is not limited to this. The work machines 101 may be wheel-type hydraulic excavators, wheel loaders, dump trucks, work robots, or the like. That is, it is sufficient if the work machines 101 include a body and a work implement attached to the body.

The embodiment of the present invention has been explained thus far. However, the embodiment described above is depicted merely as some of application examples of the present invention, and it is not aimed to limit the technical scope of the present invention to the specific configuration of the embodiment described above.

DESCRIPTION OF REFERENCE CHARACTERS

1: Managing system
2: Travel structure
3: Swing structure
4: Work implement
5: Body
10: Controller
19: Engine (power source)
100: Information control unit
101: Work machine
105: Managing apparatus (external apparatus)
107: Second communication network
109: First communication network
114: Extra-machine communication interface (first communication interface)
115: Intra-machine communication interface (second communication interface)
116: Buffer memory
121: Engine control unit (control unit)
122: Work control unit (control unit)
123: Auxiliary machine control unit (control unit)
124: Display control unit (control unit)
127: Communication terminal
133: Data transmitting/receiving section
134: Remote service processing section
135: Processing method deciding section
136: Communication performance managing section
137: State managing section
150: Management server 161: Input device
162: Communication device
165: Display device
300: Remote service request information
301: Required speed information
302: Processing profile
303, 303B: Choice condition table
304: Processing content detail information
329: Image-capturing device
345: Buffer-related data
346: Data-reduction-related data
360: Remote manipulating apparatus
361: Operation device
365: Display device
500: Data storage amount table
Da: Data storage amount
Ta: Data storage time
Ta0: Data storage allowable time
Tsa: Allowable speed
Tsm: Communication speed
Tsr: Required speed

The invention claimed is:

1. A work machine comprising:
a body;
a work implement attached to the body; and
a controller that executes a transmission process of transmitting machine-body data to an external apparatus installed outside the body,
wherein the controller is configured to:
measure a speed of communication with the external apparatus,
place a functional restriction on the transmission process when the speed of communication is lower than a predetermined required speed,
reinforce the functional restriction on the transmission process as the speed of communication lowers,
reinforce the functional restriction on the transmission process when a state of the work machine is an operation state, as compared to a case where the state of the work machine is not the operation state,
reinforce the functional restriction on the transmission process as the speed of communication lowers, by executing a data-reduced transmission process of transmitting the machine-body data while regularly thinning out the data at predetermined time intervals, when the speed of communication is lower than the required speed but equal to or higher than a predetermined allowable speed, and executing a transmission suspension process of suspending the transmission of the machine-body data, when the speed of communication is lower than the allowable speed, and
reinforce the functional restriction on the transmission process when the state of the work machine is the operation state, as compared to the case where the state of the work machine is not the operation state, by making a data reduction amount, in the data-reduced transmission process executed when the state of the work machine is the operation state, greater than the data reduction amount in the data-reduced transmission process executed when the state of the work machine is not the operation state.

2. The work machine according to claim 1,
wherein the controller is configured to:
compute a data storage time on a basis of the speed of communication and a data storage amount associated with the state of the work machine,
store the machine-body data on a buffer memory when the speed of communication is lower than the required speed and the data storage time is equal to or longer than predetermined data storage allowable time, and
execute a buffering process of transmitting the machine-body data stored on the buffer memory to the external apparatus when the speed of communication becomes equal to or higher than the required speed, and
wherein a data storage amount at a time when the state of the work machine is the operation state is smaller than a data storage amount at a time when the state of the work machine is not the operation state.

3. The work machine according to claim 2,
wherein the body has a travel structure,
wherein the operation state includes a travelling state where the travel structure is in operation and a working state where the work implement is in operation, and
wherein a data storage amount at a time when the state of the work machine is the working state is smaller than a data storage amount at a time when the state of the work machine is the travelling state.

4. The work machine according to claim 1,
wherein the controller is configured to:
transmit a retry request for resumption of the transmission process to the external apparatus when the speed of communication becomes equal to or higher than the required speed after the transmission suspension process has been executed.

5. The work machine according to claim 1,
wherein the controller is configured to:
acquire, from the external apparatus, the required speed, a processing profile defining a plurality of processing methods, and a plurality of choice conditions used to choose from the plurality of processing methods defined by the processing profile,
determine whether or not the plurality of choice conditions are satisfied, when the speed of communication is lower than the required speed, and choose a processing method on a basis of a result of the determination, and
execute the transmission process according to the chosen processing method.

6. The work machine according to claim 5,
wherein the processing profile:
defines the plurality of processing methods that are combinations of the data-reduced transmission process of transmitting the machine-body data while thinning out the data, a buffering process of storing the machine-body data on a buffer memory and transmitting the machine-body data stored on the buffer memory to the external apparatus when the speed of communication becomes equal to or higher than the required speed, the transmission suspension process of suspending the transmission of the machine-body data, and a retry request process of transmitting a retry request for resumption of the transmission process to the external apparatus when the speed of communication becomes equal to or higher than the required speed after the transmission suspension process has been executed,
wherein the controller is configured to acquire, from the external apparatus, data-reduction-related data associated with the data-reduced transmission process and buffer-related data associated with the buffering process,
wherein the data-reduction-related data defines information that identifies data to be subjected to the data-reduced transmission process, and a data reduction amount in the data-reduced transmission process, and wherein the buffer-related data defines information that identifies data to be subjected to the buffering process, and a buffer amount in the buffering process.

7. The work machine according to claim 1,
wherein the controller includes:
a communication terminal that communicates with the external apparatus via a first communication network, and
a plurality of control units that are interconnected via a second communication network and control equipment included in the work machine,
wherein the plurality of control units include an information control unit that executes the transmission process of transmitting the machine-body data to the external apparatus,
wherein the information control unit includes:
a first communication interface that is connected to the communication terminal and performs data exchange with the external apparatus via the first communication network, and
a second communication interface that performs data exchange with the plurality of control units connected to the information control unit via the second communication network,
wherein the plurality of control units include a work control unit that controls an operation of the work implement, and
wherein the information control unit manages the state of the work machine on a basis of information acquired from the work control unit via the second communication interface.

8. The work machine according to claim 7, further comprising:
an image-capturing device connected to the second communication network,
wherein the information control unit is configured to:
transmit data of an image captured by the image-capturing device to the external apparatus via the first communication network, and
receive a command for remotely operating the work machine, from the external apparatus via the first communication network, and
wherein the work control unit controls an operation of the work implement of the work machine on a basis of the command input from the information control unit via the second communication network.

* * * * *